United States Patent [19]
Hashimoto et al.

[11] Patent Number: 6,154,998
[45] Date of Patent: Dec. 5, 2000

[54] INTER-LINE FISHING ROD WITH IMPROVED FISHLINE LEAD-IN PORTION

[75] Inventors: Hiroshi Hashimoto, Tokyo; Masaru Akiba, Saitama; Yasuhisa Kaneda, Tokyo; Tomoyoshi Tsurufuji, Saitama, all of Japan

[73] Assignee: Daiwa Seiko, Inc., Tokyo, Japan

[21] Appl. No.: 08/705,087

[22] Filed: Aug. 29, 1996

[30] Foreign Application Priority Data

| Aug. 31, 1995 | [JP] | Japan | 7-246883 |
| Sep. 26, 1995 | [JP] | Japan | 7-272030 |
| Oct. 27, 1995 | [JP] | Japan | 7-303802 |
| Oct. 31, 1995 | [JP] | Japan | 7-306819 |

[51] Int. Cl.⁷ .................................................. A01K 87/04
[52] U.S. Cl. ............................................................... 43/24
[58] Field of Search ........................... 43/24, 18.1, 18.5

[56] References Cited

U.S. PATENT DOCUMENTS

| 2,282,618 | 5/1942 | Stewart . | |
| 4,507,891 | 4/1985 | Ohmura . | |
| 5,577,338 | 11/1996 | Matsumoto | 43/18.1 |
| 5,930,940 | 8/1999 | Yabe | 43/24 |

FOREIGN PATENT DOCUMENTS

| 37-15468 | 6/1937 | Japan . |
| 62-22139 | 6/1987 | Japan . |
| 1-178373 | 12/1989 | Japan . |
| 4-100377 | 8/1992 | Japan . |
| 4-248945 | 9/1992 | Japan . |
| 3007714 | 11/1994 | Japan . |
| 7-36651 | 7/1995 | Japan . |

OTHER PUBLICATIONS

Patent abstracts of Japan vol. no. 008 & JP 07 194277 A (Mamiya OP Co. LTD), Aug.1,1985.

*Primary Examiner*—Jack W. Lavinder
*Attorney, Agent, or Firm*—Liniak, Berenato, Longacre & White

[57] ABSTRACT

A fishing rod allowing a fishline to pass through which has a fishline lead-in guide member so configured as to provide a larger opening, to perform smoothly the operation of guiding and passing a fishline therethrough and as to be lightweight and simple in structure. A fishline lead-in guide member 4 has laterally symmetrical arm portions 4a installed on the fishing rod 1 and extended forward above a fishline lead-in hole 3a provided in the fishing rod 1. The arm portions 4a form an opening whose width α is greater than the lateral width β of the fishline lead-in hole. The fishline lead-in guide member also has a fishline guide portion 4e positioned in the rear of the arm portions and provided with a guide hole 15 situated at a level higher than the surface of the fishing rod in the rear of the fishline lead-in hole. The fishline lead-in guide member is mounted in such a manner that at least one of the end portions 4c, 4f of the fishline lead-in guide member is held on the butt grip 1.

19 Claims, 18 Drawing Sheets

INTER-LINE FISHING ROD WITH IMPROVED FISHLINE LEAD-IN PORTION

BACKGROUND OF THE INVENTION

The present invention relates to an inter-line fishing rod allowing a fishline to pass through and more particularly to improvement in a fishline lead-in portion.

Heretofore, a typical fishing rod allowing a fishline to be introduced from the outside into the inside of the fishing rod has been so structured that as disclosed in Japanese Utility Model No. 3007714, for example, a plastic fishline lead-in guide fitted in the hole bored in the fishing rod has an open upper portion in order to perform smoothly the operation of guiding and passing the fishline therethrough, and both side walls for protecting a guide member made of ceramics and the like. Moreover, such a fishing rod is equipped with guide members and a fishline-receiving portion for reducing the friction of a contact portion against a fishline to be introduced from the rear side into the forward section of the fishing rod or introduced in a third direction; namely an upper or lateral direction.

As the side walls are large and heavy, and so are the guide members and the fishline-receiving portion to a degree, the fishline lead-in guide as a whole tends to become heavy.

An attempt to reduce the weight by decreasing the wall thickness of the frame body such as the side walls of the fishline lead-in guide may result in lowering its strength, thus rendering the fishline lead-in guide liable to damage. Moreover, the guide members and the fishline-receiving portion tend to be easily out of place.

Moreover, the frame body of such a fishline lead-in guide becomes complicated in structure and this causes an increase in cost since the fishline-receiving portion in addition to the guide members is installed.

The primary problem to be solved includes the presence of side walls, a plurality of guide members and a fishline-receiving portion which results in increasing weight; a decrease in strength and liability to damage in an attempt to reduce weight by decreasing the wall thickness of the frame body of a fishline lead-in guide; tendency for the guide members and the fishline-receiving portion to be easily out of place; an increase in cost as the frame body of the fishline lead-in guide becomes complicated in structure.

Japanese Utility Model Laid-Open No. 100377/1992, Japanese Patent Laid-Open No. 248945/1992 and Japanese Utility Model Laid-Open No. 178373/1989 disclose a structure in the vicinity of a fishline lead-in portion for introducing a fishline from the outside into a fishing rod allowing a fishline to pass through. According to the '377 and '945 publications, a hole for use in introducing a fishline is formed in the thick-walled portion of a fishing rod and a frame body or a tubular frame body having a fishline lead-in hole located outside the former hole is disposed. According to the '373 publication above, a fishline lead-in portion is arranged at the joint between the male and female ferrules of both sections of a fishing rod.

According to the '377 and '945 publications, however, the fishing rod area near the hole is reinforced since the hole for use in introducing the fishline is formed in the thick-walled portion, so that the flexural rigidity is extremely high only in this area as compared with the remainder. Consequently, only this area is not readily bent even when a load is applied to the fishing rod, which results in rendering the deflection less smooth and thus causing the fishing rod to be badly balanced. Moreover, the fishing rod is easily damaged because of the stress concentrated on the longitudinal end portion of the thick-walled portion.

According to the '373 publication, further, the coupling length tends to become greater since the fishline lead-in portion is arranged at the joint between the male and female ferrules of both sections of the fishing rod. Since the area with high flexural rigidity is long, no smooth deflection is obtained and the problem is that the strength is lowered because of the cutout structure, to say nothing of a poor deflection balance. Further, the flexural rigidity of each coupling portion is high in the case of a coupling type fishing rod allowing a fishline to pass through. The flexural rigidity of each coupling portion of the couple type fishing rod is high in addition to the fact that the flexural rigidity of the fishline lead-in portion is high tends to worsen the deflection balance of the fishing rod as a whole.

Japanese Utility Model No. 22139/1987 and Japanese Utility Model Laid-Open No. 36651/1995, for example, disclose fishline lead-in guides for fishing rods allowing fishlines to pass through. The fishline guide holes in fishline lead-in guides mentioned in those '139 and '651 publications have been defined as slots bored in the longitudinal direction of fishing rods; this is because it has been intended to deal with problems of improving fishline passableness and making the slot correspond to various angles at which the fishline is inserted in the fishing rod due to reel replacement. Notwithstanding, the problem of improving the fishline passableness is not solvable by simply providing a long fishline guide hole in the longitudinal direction of the fishing rod. Consequently, a relatively wide fishline guide hole has been contrived.

In a case where the width of the fishline guide hole is set to cover the whole length, the fishline to be guided from the fishline guide hole to the hollow portion inside the fishing rod is allowed to freely oscillate and vibrate, thus the effect of guiding the fishline is worsened. Consequently, the fishline is allowed to easily abut against the inside of the fishing rod while the fishline is being wound or released, which means an increase in the thread resistance.

When the fishline guide hole is widened, moreover, it poses a problem in that the strength of the fishing rod will be lowered. In consideration of only the strength of such a fishing rod, the width of the fishline guide hole should be decreased at the cost of making poor the fishline passability.

SUMMARY OF THE INVENTION

In view of the foregoing problems, an object of the present invention is to provide a fishing rod allowing a fishline to pass through which has a fishline lead-in guide member so configured as to provide a larger opening, to perform smoothly the operation of guiding and passing a fishline therethrough and as to be lightweight and simple in structure.

Another object of the present invention is to provide a fishing rod allowing a fishline to pass through which has an inexpensive fishline lead-in guide member offering increased strength.

Still another object of the present invention is to provide an inexpensive fishing rod allowing a fishline to pass through which is easily assembled and fitted up.

In order to accomplish the aforesaid objects, the invention provides as a first feature a fishing rod allowing a fishline to pass through wherein a fishline lead-in guide member has laterally spaced arm portions extended forward above a fishline lead-in hole provided in a rod pipe the arm portions form an opening whose width is greater than the lateral width of the fishline lead-in hole, the fishline lead-in guide member further has a fishline guide portion positioned in the rear of the arm portions and provided with a guide hole situated at a level higher than the surface of the fishing rod in the rear of the fishline lead-in hole. The fishing rod is adapted to hold at least one end portion of the fishline lead-in guide member.

"Above the fishline lead-in hole" means the outside in the radial direction of the fishing rod and when the fishing rod is used with the fishline lead-in hole facing downward, it includes a situation in which the arm portions of the fishline lead-in guide member are located under the fishline lead-in hole.

The invention provides as a second feature fishing rod allowing a fishline to pass through wherein, a fishline lead-in guide member, provided over a wall of a hole formed in a rod pipe, for forming an fishline lead-in hole is made integral with a member for defining a guide hole situated at a level higher than the surface of the rod pipe in the rear of the fishline lead-in hole.

Since the width of the opening formed by the lateral arm portions of the fishline lead-in guide member mounted on the fishing rod allowing a fishline to pass through is greater than the lateral width of the fishline lead-in hole according to the first feature, the upper side of the fishline lead-in hole is opened, whereby the operation of passing and guiding the fishline is performed smoothly and as the lower sides of the arm portions are also opened, the fishline lead-in guide member can be made lightweight and simple in structure.

The fishline lead-in guide member may be formed with a metal sheet so that it becomes highly resistant to pressure and impact in particular with increased strength and it can also be manufactured less costly by press molding.

Leg portions may be formed in front of the arm portions and behind the fishline guide portion and secured to the outer side of the fishing rod to increase the strength of the fishline lead-in guide member.

Further, the fishline lead-in guide member may be held slidably on the fishing rod with predetermined force in such a manner that its position relative to the fishline lead-in hole is made variable. Fishline resistance is then made reducible in proportion to the variation of an angle at which the fishline is introduced, so that the fishline lead-in guide member is made usable for reels of various sizes and many kinds with the effect of reducing the fishline resistance.

According to the second feature, it is possible to reduce manufacturing cost as the number of parts is small while parts control and assembling work are simplified. Moreover, no positional adjustment of the fishline lead-in hole and the guide hole is needed during the assembling work, whereby assembling and fitting up are simplified.

Yet another object of the present invention is to improve the deflection balance of a fishing rod.

Yet another object of the present invention is to improve the defection balance of a fishing rod allowing a fishline to pass through while preventing stress concentration in the fishing rod due to the reinforcement of the vicinity of a hole for using in introducing a fishline.

In view of the aforesaid objects, the invention provides as a third feature a fishing rod allowing a fishline to pass through wherein a hole for use in introducing a fishline in a rod pipe is formed,, a reinforced portion is formed in an area of the fishing rod on the periphery of the hole, and flexural rigidity at the end portion of the reinforced portion is gradually decreased in the longitudinal direction.

The reinforced portion means reinforcement by increasing wall thickness and is intended for collapse and buckling resistance. Therefore, a ductile material such as metal, fiber reinforced resin, fiber reinforced metal, plastics or the like is used as a fragile material such as ceramics and the like is not fit for use as a reinforcing material. However, an ordinary rubber material does not serve to the reinforcing purpose. This situation is the same as in claim 2.

The invention further provides as a fourth feature a fishing rod allowing a fishline to pass through and having front and rear rod pipes coupled together, wherein a hole for use in introducing a fishline is formed in a position close to the coupling portion of one rod pipe, an area of the one rod pipe around the hole is reinforced, and the coupling portion of the other rod pipe is coupled to the coupling portion of the one rod pipe so that an end of the coupling portion of the other fishing rod is positioned in the reinforced portion and in contact therewith.

According to the third feature, since the fishing rod area on the periphery of the hole has been reinforced, breakage is prevented from being started from the area on the periphery of the hole when a load is applied to the fishing rod and besides stress is prevented from being concentrated in that part since flexural rigidity has gradually been decreased at the end of the reinforced portion. Thus the area on the periphery of the hole is hardly damaged but smoothly bent, so that the deflection balance is improved.

According to the fourth feature, since the hole for use in introducing the fishline is formed near the coupling portion, the reinforced portion on the periphery of the hole can be used simultaneously as a coupling portion necessary for reinforcement to hole the coupling strength and consequently a portion having an extremely high stiffness factor becomes smaller as viewed from the whole fishing rod, whereby the deflection balance of the fishing rod is made improvable.

Still another object of the present invention proposed in view of the foregoing problems is to provide a fishing rod allowing a fishline to pass through which is intended to reduce the resistance of the fishline without deteriorating its passability while maintaining its strength.

In order to accomplish the object above, a fishing rod allowing a fishline to pass through according to a fifth feature of the present invention is such that a fishline guide hole for use in guiding a fishline from the outside into an inner hollow portion is formed in a rod pipe, a fishline lead-in guide is provided for the fishline guide hole, the fishline guide hole is a slot made in the direction in which the fishing rod is extended, and the fishline guide hole has a wide and a narrow portion.

The following arrangements are conceivable: the narrow portion of the fishline guide hole is formed on the tip section side of the fishline guide hole, whereas the wide portion is formed on the butt grip side thereof; the narrow portion is formed on forward and backward sides of the fishline guide hole, whereas the wide portion is formed in the central part thereof; the narrow portion is formed on the butt grip side of the fishline guide hole, whereas the wide portion is formed on the tip section side thereof.

Still another object of the present invention is to provide a fishing rod allowing a fishline to pass through which has a fishline lead-in guide member light in weight, simple in structure and smooth in outer contour without adversely affecting flexural characteristic or deflection balance of the fishing rod.

To attain the above-noted object, the present invention provides, as a sixth feature, a fishing rod allowing a fishline to pass through, in which a fishline lead-in hole is formed through the fishing rod, front and rear portions of a fishline lead-in guide member is mounted on the fishing rod so that a fishline lead-in guide hole of the fishline lead-in guide member is located behind the fishline lead-in hole formed through the fishing rod, an intermediate portion of the fishline lead-in guide member extends between the front and rear portions like a bridge so as to form a spatial gap radially between the intermediate portion and an outer periphery of the fishing rod.

According to the sixth feature of the present invention, the intermediate portion of the fishline lead-in guide member is formed as a bridge to form the spatial gap, the side walls of the fishline lead-in guide member can be dispensed with. Thus, the fishline lead-in guide member can be made simple in structure and light in weight. Further, the fishline lead-in guide member is mounted onto the fishing rod through the front and rear portions with the intermediate portion be spaced away from the fishing rod, the fishline lead-in guide member does not adversely affects the flexural characteristic or deflection balance of the fishing rod. Further, an outer contour of the intermediate portion of the fishline lead-in guide member in the embodiments of the present invention is formed smooth, it is possible to avoid the entanglement of the fishline onto the fishline lead-in guide member during the fishing.

BRIEF DESCRIPTION OF THE ACCOMPANYING DRAWINGS

Figure 34A:
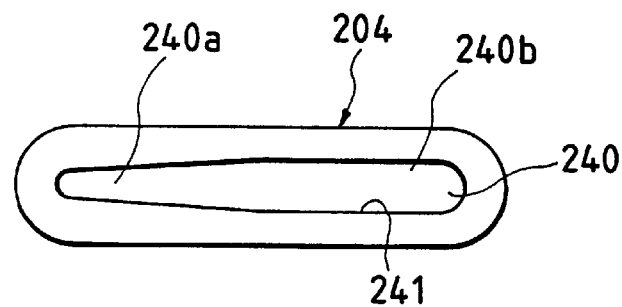
Figure 34B:
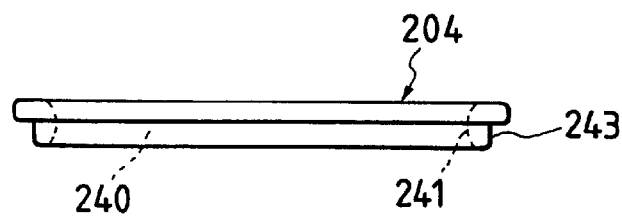
Figure 34C:
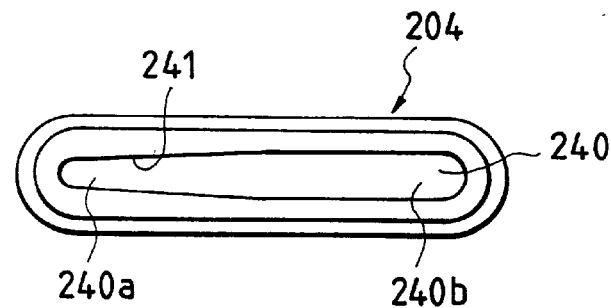
Figure 34D:
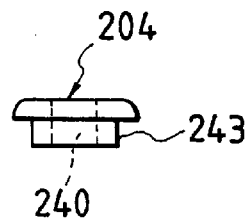

FIGS. 34(a) to 34(d) are diagrams illustrating a fishline lead-in guide of a fishline allowing a fishline to pass through according to the 23rd embodiment of the invention wherein FIG. 34(a) is a plan view; FIG. 34(b), a side view; FIG. 34(c), a bottom view; and FIG. 34(d), a rear elevation.

Figure 35:
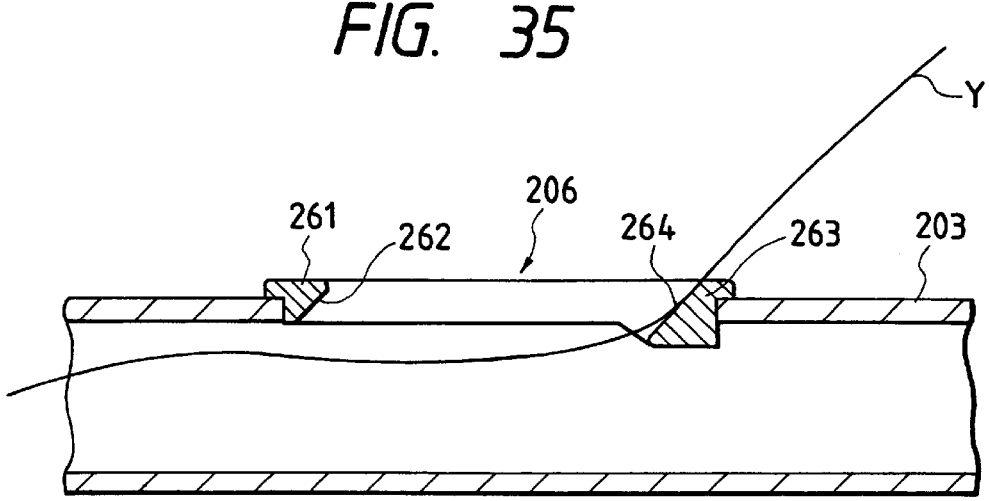

FIG. 35 is side sectional view showing the vicinity of the principal part of a fishline allowing a fishline to pass through according to a 24th embodiment of the invention.

Figure 36:
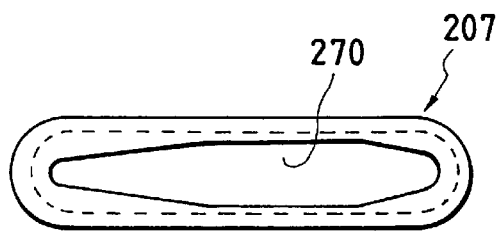

FIG. 36 is plan view showing a fishline lead-in guide for use in a fishline allowing a fishline to pass through according to a 25th embodiment of the invention.

Figure 37:
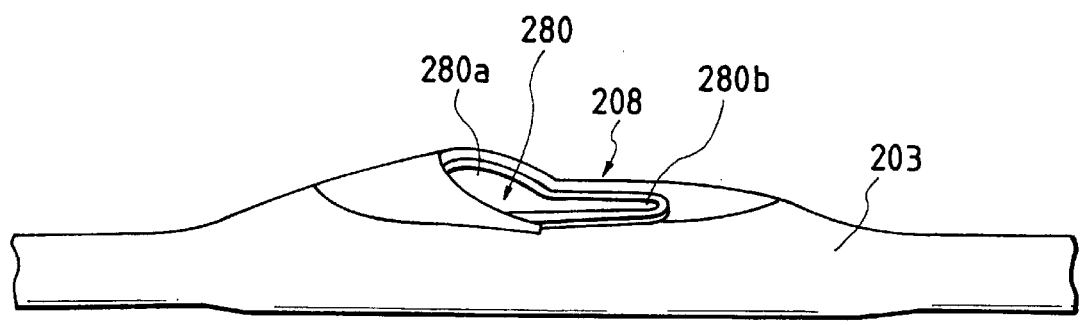

FIG. 37 is perspective view showing the vicinity of the principal part of a fishline allowing a fishline to pass through according to a 26th embodiment of the invention.

DETAILED DESCRIPTION OF THE PREFERRED EMBODIMENTS

Figure 1:
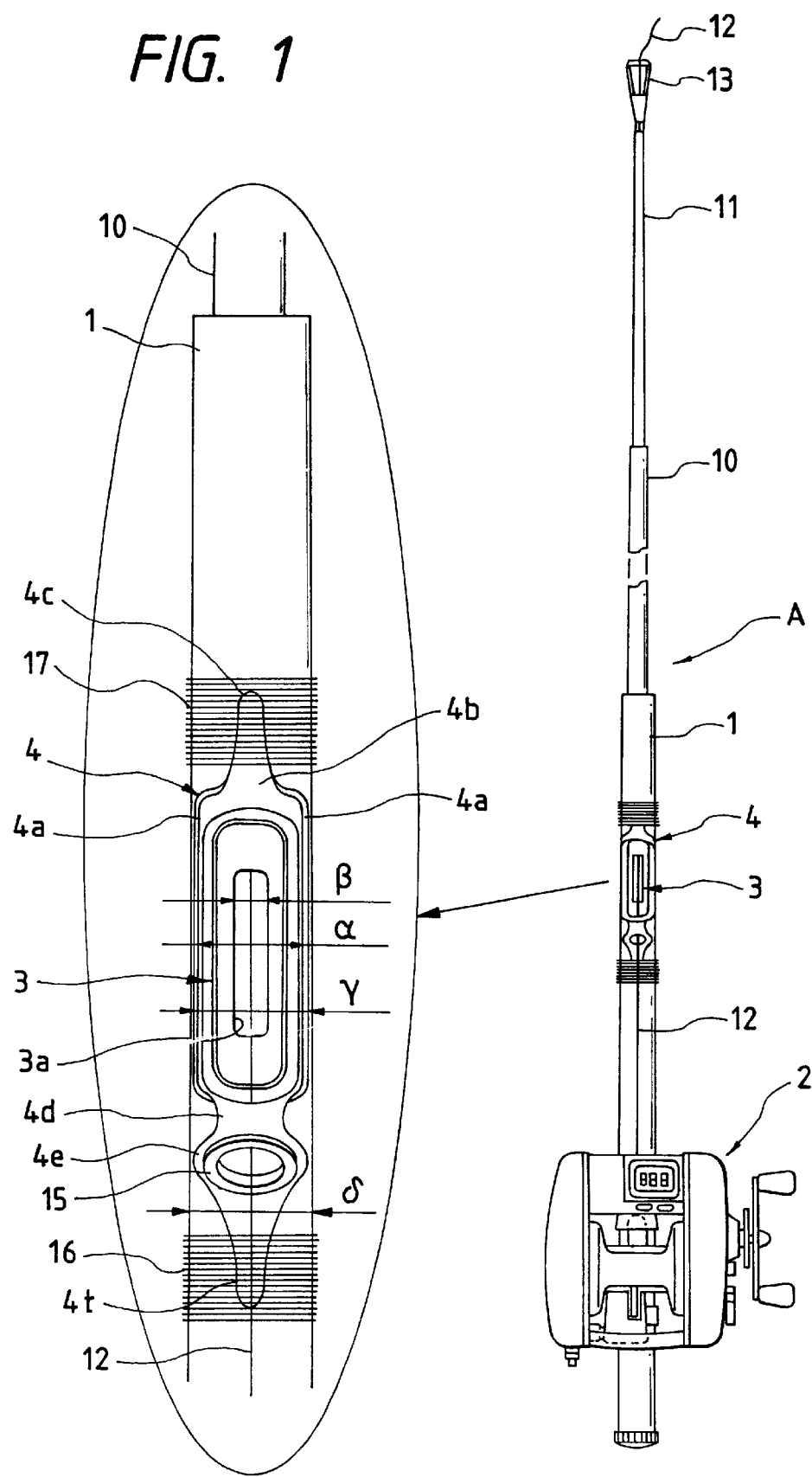
FIG. 1 is plan view of a fishing rod for allowing a fishline to pass through together with a partially enlarged plan view thereof according to a first embodiment of the invention.
Figure 2:
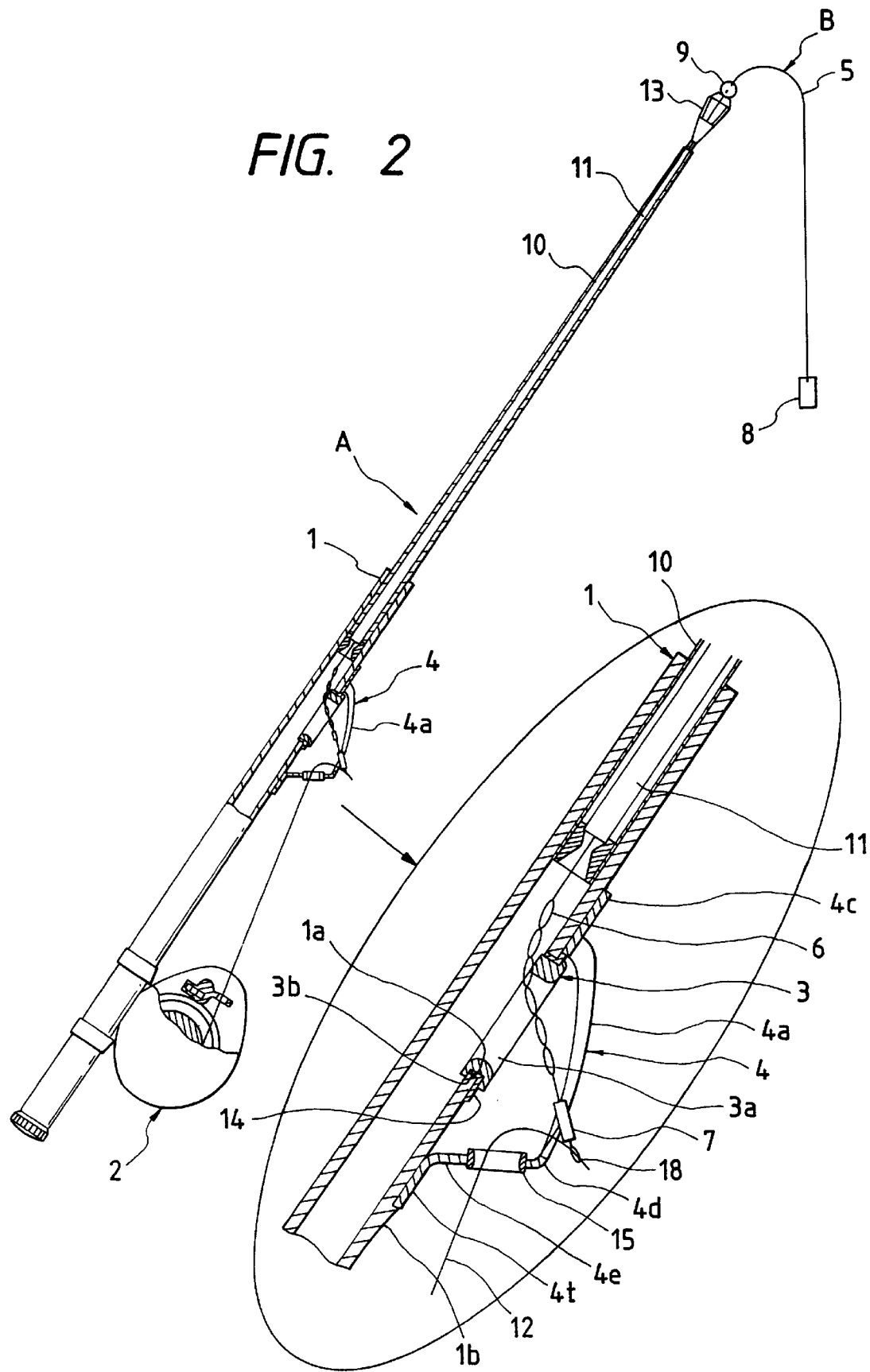
FIG. 2 is sectional side view of the principal part of the fishing rod into which a fishline threader is inserted together with a partially enlarged vertical sectional view thereof according to the first embodiment of the invention.
Figure 3:
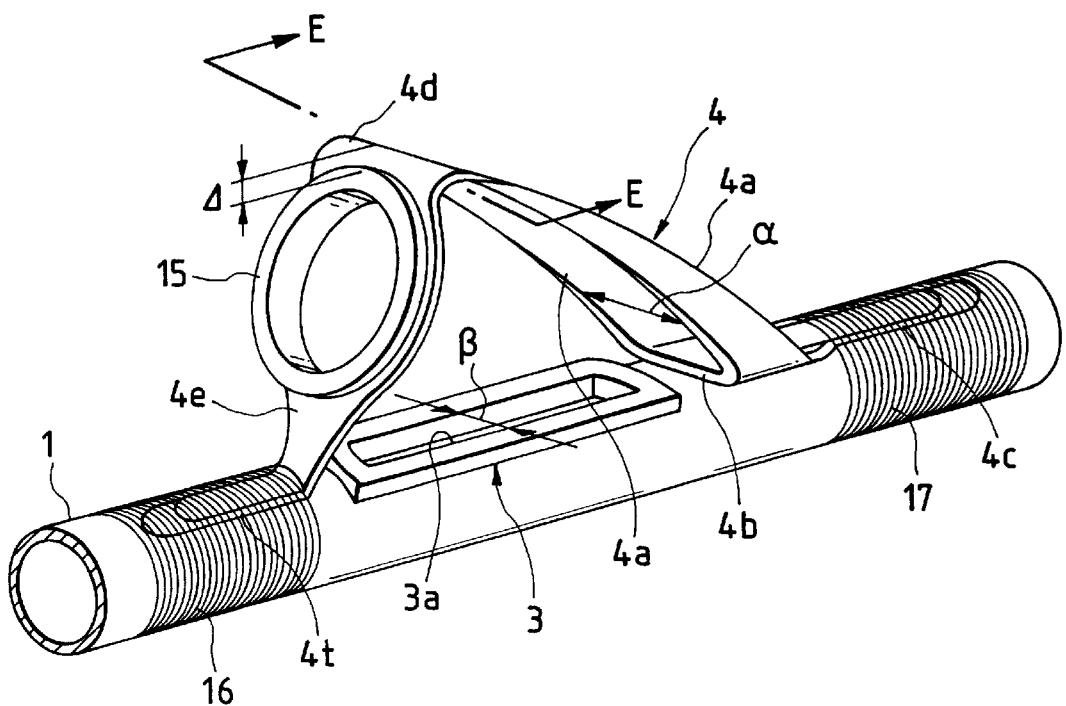
FIG. 3 is perspective view of the principal part of the fishing rod allowing a fishline to pass through according to the first embodiment of the invention.
Figure 4:
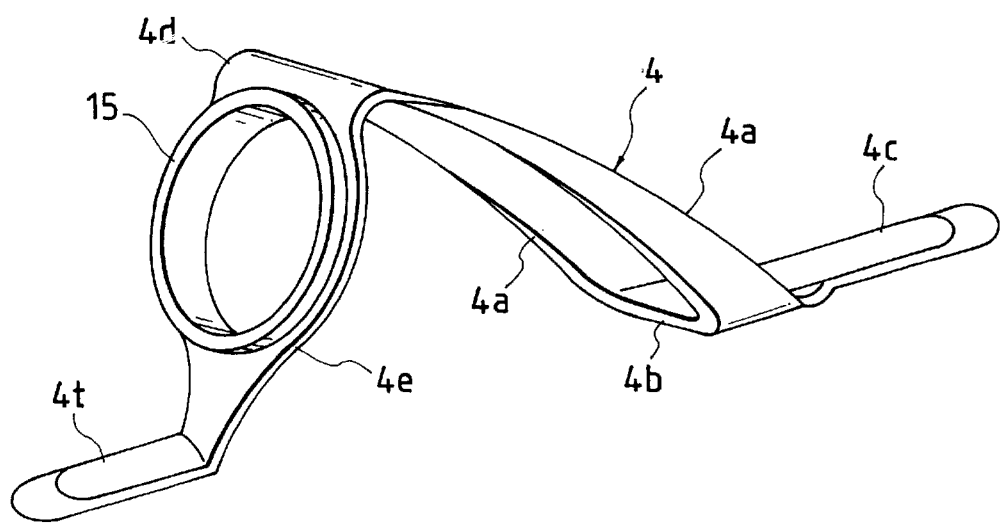
FIG. 4 is perspective view of the fishline lead-in guide member according to the first embodiment of the invention.
Figure 5:
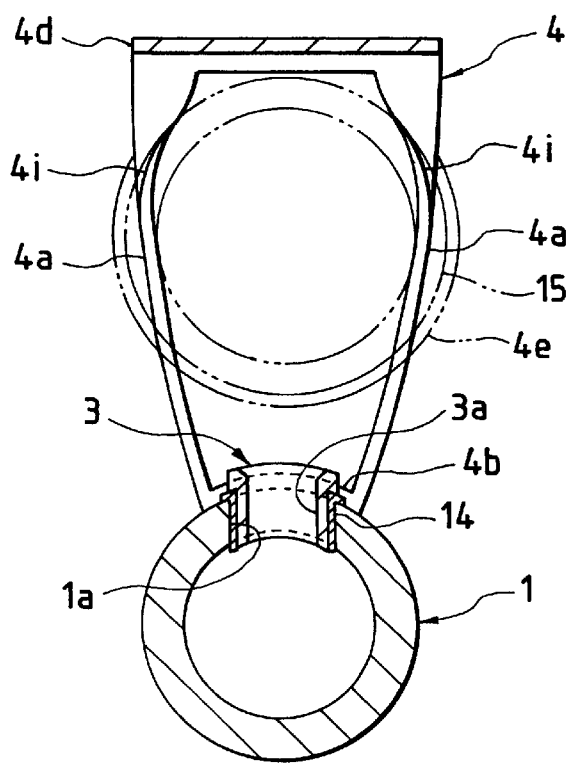
FIG. 5 is sectional rear elevation taken on line E—E of FIG. 3.
Figure 6:
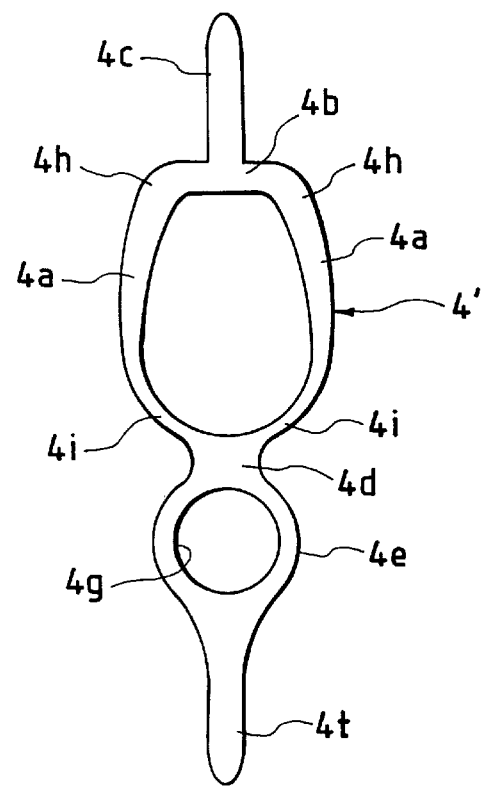
FIG. 6 is development plan view of a fishline lead-in guide member body.

A description will subsequently be given of an embodiment of the present invention by reference to the accompanying drawings. In FIGS. 1 through 6 inclusive, there is shown a first embodiment of the present invention: FIG. 1 is a plan view of a fishing rod for allowing a fishline to pass through together with a partially enlarged plan view thereof; FIG. 2 a sectional side view of the principal part of the fishing rod into which a fishline threader is inserted together with a partially enlarged sectional side view thereof; FIG. 3 a perspective view of the fishing rod fitted with a fishline lead-in guide member; FIG. 4 a perspective view of the fishline lead-in guide member; FIG. 5 a sectional rear elevation of the fishing rod together with the fishline lead-in guide member taken on line E—E of FIG. 3; and FIG. 6 a development plan view of a fishline lead-in guide member body.

A fishing rod A for allowing a fishline to pass through includes a plurality of sections to be coupled together in such a manner that a tip section 11 is joined to a middle section 10 which is joined to a butt grip 1 by fitting their male ferrules into their female ferrules, for example. When a fishline 12 wound on the spool of a reel 2 mounted on the reel seat of the butt grip 1 is passed through the fishing rod, a fishline threader B is inserted from the tip end of a fishline guide 13 into the tip section 11 first.

A process of producing each of these sections 1, 10, 11 above includes winding a rectangular prepreg cut sheet (not shown) around a core bar (not shown) a desired number of times, applying taping to the outer side of the winding, putting the section into a heating oven so as to mold it integrally with heat treatment.

The prepreg sheet is prepared by reinforcing woven cloth with high-strength fiber, for example, carbon fiber, glass fiber, aramido fiber, alumina fiber or any other organic or inorganic fiber and impregnating (or mixing) the reinforced woven cloth with thermosetting or thermoplastic resin such as epoxy resin, phenol resin or polyester resin.

A slot 1a is formed in the longitudinal direction of the butt grip 1 and a fishline lead-in guide 3 is securely fitted therein via a cushioning material 14. The fishline lead-in guide 3 is formed of hard material such as metal, ceramics or the like. A fishline lead-in hole 3a in the form of a wide slot extending in the axial direction is formed in the central part of the fishline lead-in guide 3 and a recess 3b which is U-shaped in traverse cross section is formed on one end side of longitudinal ends of the outer peripheral edge of the fishline lead-in guide 3 and besides the edge (wall) of the slot 1a of the butt grip 1 is fitted in the recess 3b.

A fishline lead-in guide member 4 is securely fitted to the butt grip 1 in the longitudinal direction of the fishline lead-in guide 3. The fishline lead-in guide member 4 is made of metal or alloy of stainless or titanium, hard synthetic resin, reinforced resin, reinforced ceramics, fiber reinforced metal or hard material prepared by vapor-depositing metal or ceramics on the surface of any one of the materials above.

The fishline lead-in guide member 4 has a left and a right arm portion 4a, 4a gently tilting forward, an arm connecting portion 4b and a leg portion 4c, these portions being integrally formed with each other. Further, a fishline guide portion 4e sharply tilting down backward via another connecting portion 4d is formed in the rear of the arm portions 4a, 4a, and so is a leg portion 4f further backward. Therefore, both the arm portions are made continuous in a substantially rectangular shape by the connection portions 4b, 4d, whereby the strength of the fishline lead-in guide member 4 is structurally increased.

A guide ring 15 is fixed to the guide hole of the fishline guide portion 4e. Although the guide ring 15 is made of hard material such as ceramics, any impact will be stopped by the top of the fishline lead-in guide member 4 even though the impact is applied to the member 4 and the guide ring 15 will be prevented from being damaged because it is situated in a position lower by Δ than the top of the member 4. Instead of the guide ring 15 made of hard material, the guide hole edge provided for the fishline guide portion 4e of the fishline lead-in guide member 4 may be coated with an abrasion resistant film.

Width α of the opening formed by the separated arm portions 4a, 4a is set greater than the lateral width β of the fishline lead-in hole 3a of the fishline lead-in guide 3. Although the inner peripheral diameter of the guide ring 15 is desired to be a mediant between the width α of the opening and the width β of the fishline lead-in hole 3a, it may be smaller than the width β of the fishline lead-in hole 3a or greater than the width α of the opening.

The external distance T between the arm portions 4a, 4a is desired to be substantially equal to the outer diameter δ of the butt grip 1 in order to prevent fishline entanglement.

In a case where the fishline lead-in guide member 4 is formed of a metal plate, a metal plate 4' is used to integrally form by punching the arm portions 4a, 4a, the connecting portion 4b and the leg portion 4c; and the other connecting portion 4d, the fishline guide portion 4e and the leg portion 4f in the rear of the arm portions 4a, 4a. A through-hole 4g for the guide ring 15 is formed in the fishline guide portion 4e. Further, the arm portions 4a, 4a each have wide portions 4h, 4h on the side of the connecting portion 4b, and narrow portions 4i, 4i on the side of the other connecting portion 4d. When the metal plate 4' is bent into such a fishline lead-in guide member 4, the narrow portions 4i, 4i of the arm portions 4a, 4a are respectively twisted and bent so that the wide portions 4h, 4h are raised with respect to the connecting portion 4b.

With reference to the fishline lead-in guide member 4 to be fitted to the butt grip 1, a stepwise protrusion 1b is formed on the butt grip 1 as shown in FIG. 2 and the leg portion 4f is made to abut against the protrusion 1b simultaneously when the leg portion 4f is placed on the outer periphery of the butt grip 1 and a string 16 is fixedly wound thereon. The leg portion 4c is placed on the outer periphery of the butt grip 1 and fixed by winding a string 17 thereon.

When the fishline 12 is passed through each section of the fishing rod, the fishline threader B that is inserted from the tip end of the fishline guide 13 of the tip section 11 is fitted with a fishline retaining member 7 via a flexible portion 6 at one end of a fishline proper 5, whereas a leg member 8 is fixed to the other end thereof. On the side of the leg member 8, a stopper member 9 is fitted in so that it is stopped in an adequate position away from the fishline retaining member 7.

The fishline proper 5 is prepared by coating the outer periphery of a stainless wire, for example, with resin and made flexible. The flexible portion has a plurality of metal tubes which are coupled together as shown in FIG. 2 and made flexible by the weight of the fishline retaining member 7. A string-like fishline engaging portion 18 is fixed to the fishline retaining member 7. The stopper member 9 is made of synthetic resin, for example, and provided with a through-hole in which an elastic damper (not shown) having a hole is fixed.

When the fishline threader B is inserted in the fishing rod A, the middle section 10 is pulled out of the butt grip 1 while the tip section 11 is contained in the middle section 10.

Subsequently, the stopper member 9 is moved so that the distance between the fishline engaging portion 18 of the fishline threader B and the stopper member 9 becomes substantially equal to the distance between the tip end of the fishline guide 13 of the tip section 11 and the fishline lead-in hole 3a of the fishline lead-in guide 3. After the step of handling the fishline threader B is completed, the sections of the fishing rod are substantially sheathed once and the fishline retaining member 7 of the fishline threader B is inserted from the tip end of the fishline guide 13 of the tip section 11 into the fishing rod. When the fishing rod is set upright then, the fishline threader B falls downward in the sections of the fishing rod because of the weight of the fishline retaining member 7. Therefore, the stopper member 9 abuts against the tip end of the fishline guide 13 in the retracted condition or when the middle section is pulled out.

When the middle section 10 containing the tip section 11 is pulled out, the stopper member 9 abuts against the tip end of the fishline guide 13 and the fishline retaining member 7 takes the position of the fishline lead-in hole 3a of the fishline lead-in guide 3. When the fishing rod A is tilted so that the fishline lead-in hole 3a faces downward, the flexible portion 6 is bent by the weight of the fishline retaining member 7 and then the fishline retaining member 7 and the fishline engaging portion 18 become projected from the fishline lead-in hole 3a.

The fishline threader B is pulled up and removed after the fishline 12 pulled out of the reel 2 and the fishline engaging portion 18 are fastened together in that state, whereby terminal tackles (not shown) are coupled to the fishline 12.

When the fishline threader B is thus passed through the fishing rod A, the middle section 10 is pulled out of the butt grip 1 while the tip section 11 is contained in the middle section 10 with the reel 2 position downward and the tip end side positioned upward. When the fishing rod A is tilted with the fishline threader B that has passed therethrough, the fishline threader B falls downward in the sections of the fishing rod because of the weight of the fishline retaining member 7 and then the flexible portion 6 is bent by the weight of the fishline retaining member 7, whereby the fishline retaining member 7 and the fishline engaging portion 18 becomes projected from the fishline lead-in hole 3a extended in the longitudinal direction of the fishline lead-in guide 3. It is thus exceedingly facilitated to not only fasten the fishline engaging portion 18 and the fishline 12 together but also guide the fishline 12 through each section of the fishing rod since pulling the fishline threader B out of the fishing rod is only needed.

The distance between the fishline engaging portion 18 of the fishline threader B and the stopper member 9 is made adjustable by moving the stopper member 9 in proportion to the distance between the tip end of the fishline guide 13 of the tip section 11 and the fishline lead-in hole 3a of the fishline lead-in guide 3.

Since the fishline threader B is passed through the fishing rod A with the reel 2 positioned downward and the tip end side positioned upward, the tip section 11 is prevented from flying out and since the heavy reel side is set lower than the tip end side, further, the fishline threader B can be passed therethrough with stability and the tip section 11 is prevented from being broken after it has flied out.

The upper side of the fishline lead-in hole 3a of the fishline lead-in guide 3 is opened and width α of the opening formed by the arm portions 4a, 4a of the bridge-like fishline lead-in guide member 4 secured to the butt grip 1 in the longitudinal direction of fishline lead-in guide 3 is set greater than the lateral width β of the fishline lead-in hole 3a, whereby the operation of passing the fishline through the fishing rod is facilitated because the fishline threader B is readily projected from the arm-to-arm opening.

Since the width α of the opening formed by the arm portions 4a, 4a of the fishline lead-in guide member 4 secured to the butt grip 1 of the fishing rod A is set greater than the lateral width β of the fishline lead-in hole 3a of the fishline lead-in guide 3 as described above, the upper side of the fishline lead-in hole 3a is kept wide open, so that the operations of passing and guiding the fishline therethrough is performed smoothly. Since the lower sides of the arm portions 4a, 4a are also opened without any wall, the fishline lead-in guide member can be made lightweight and simple in structure.

Moreover, the fishline lead-in guide member 4 formed of a metal plate and a wire bar is highly resistant to pressure and impact as its arm portions 4a, 4a are twisted and three-dimensionally structured, which makes the fishline lead-in guide member 4 lightweight, strong and besides simple in structure.

With the fishing rod thus structured, the upper side of the fishline lead-in hole 3a is opened since the width α of the opening formed by the lateral arm portions 4a, 4a of the fishline lead-in guide member 4 secured to the butt grip 1 of the fishing rod A is set greater than the lateral width β of the fishline lead-in hole 3a of the fishline lead-in guide 3 as described above, whereby the operation of passing and guiding the fishline is performed smoothly. Since the lower sides of the arm portions 4a, 4a are also opened, the fishline lead-in guide member can be made lightweight and simple in structure.

Moreover, the fishline lead-in guide member 4 is highly resistant to pressure and impact as its arm portions 4a, 4a are twisted, which makes the fishline lead-in guide member 4 lightweight, strong and besides simple in structure.

In addition, the outer contour of the fishline guide member 4 is formed smooth, so that fishline entanglement can be prevented during fishing.

Figure 7:
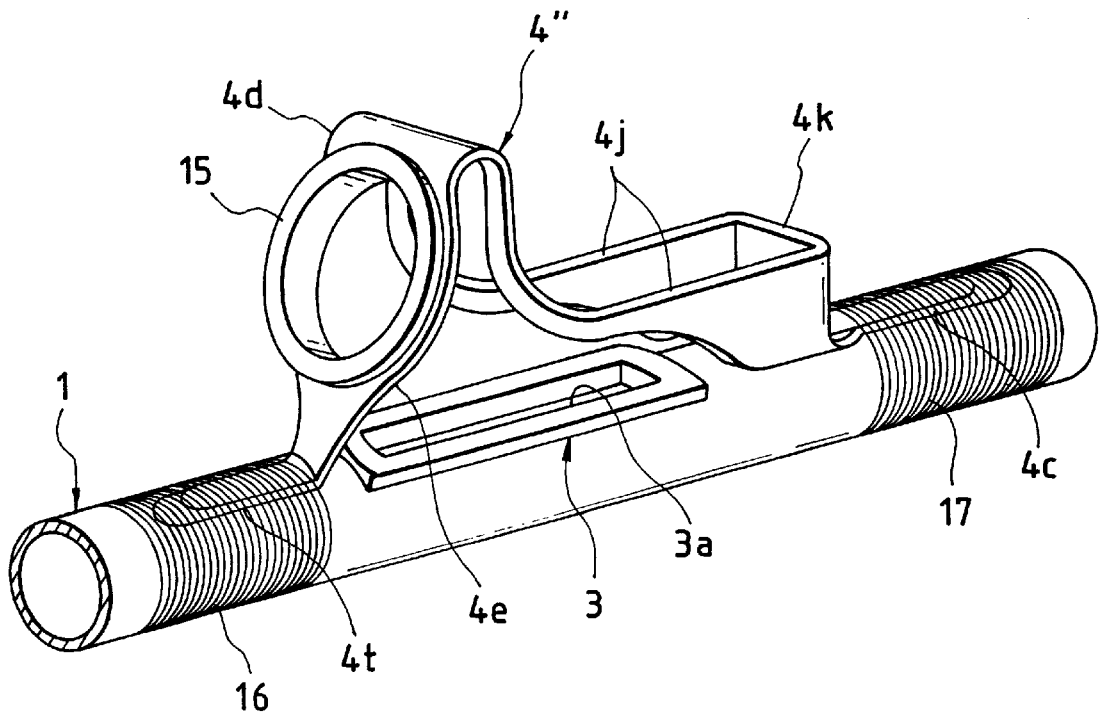
FIG. 7 is perspective view of the principal part according to a second embodiment of the invention.
Figure 8:
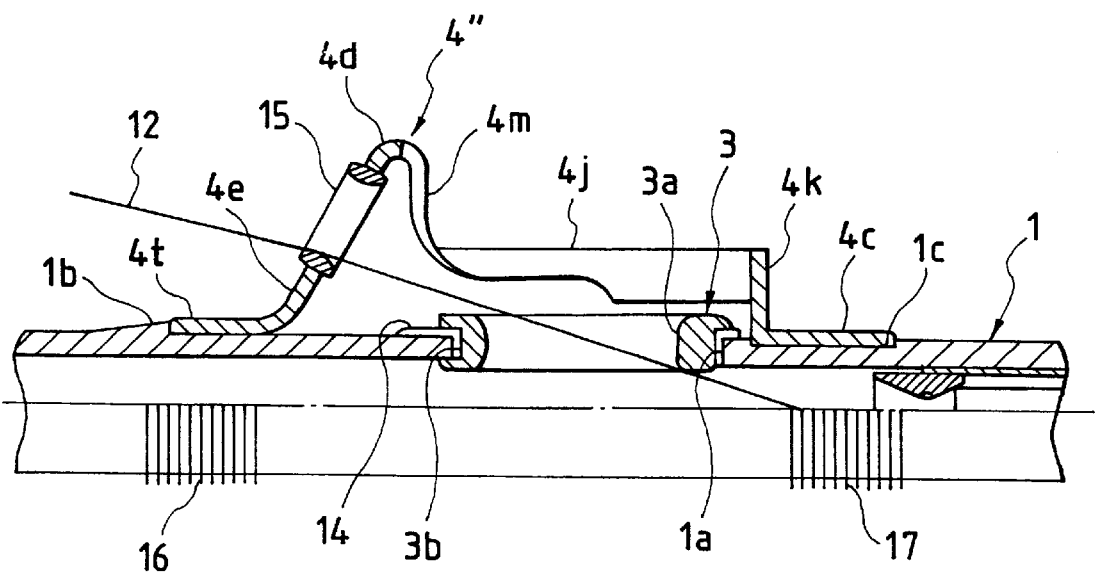
FIG. 8 is side view of the upper half section of FIG. 7.

FIGS. 7, 8 refer to a second embodiment of the present invention: FIG. 7 is a perspective view of a fishing rod for allowing a fishline to pass through with a fishline lead-in guide member 4" fitted thereto; and FIG. 8 a side view of the upper half of the fishline lead-in guide member 4" in cross section.

The fishline lead-in guide member 4" according to the second embodiment of the invention is provided with lateral arm portions 4j, 4j, a connecting portion 4k at the leading end of the arm portions 4j, 4j, and a leg portion 4c. A fishline guide portion 4e sharply tilting down backward is formed in the rear of the arm portions 4j, 4j via another connecting portion 4f. A guide ring 15 is fixed to the hole of the fishline guide portion 4e. Further, the arm portions 4j, 4j each have wide portions on the side of the connecting portion 4k and narrow portions 4m, 4m on the side of the other connecting portion 4d. The narrow portions 4m, 4m of the arm portions 4j, 4j are twisted and bent, respectively.

The remaining configuration is substantially the same as that of the first embodiment of the present invention.

With reference to the fishline lead-in guide member 41" to be fitted to the butt grip 1, the protrusion 1b is formed on the butt grip 1 as shown in FIG. 8 and the leg portion 4f is made to abut against the protrusion 1b simultaneously when the leg portion 4f is placed on the outer periphery of the butt grip 1 and the string 16 is fixedly wound thereon. The leg portion 4c is fitted in a slender recess 1c formed in the outer peripheral portion of the butt grip 1 and fixed by winding the string 17 thereon.

As shown in FIG. 8, the fishline 12 is passed through the fishline lead-in hole 3a of the fishline lead-in guide 3 and the guide ring 15. In this case, it is preferred that the position of the fishline lead-in guide 3 relative to the position of the fishline lead-in guide member 4" with the guide ring 15 fixed thereto is such that the angle between the longitudinal direction of the butt grip 1 and the fishline 12 to be introduced is within 45° (preferably 10°–30°).

Figure 9:
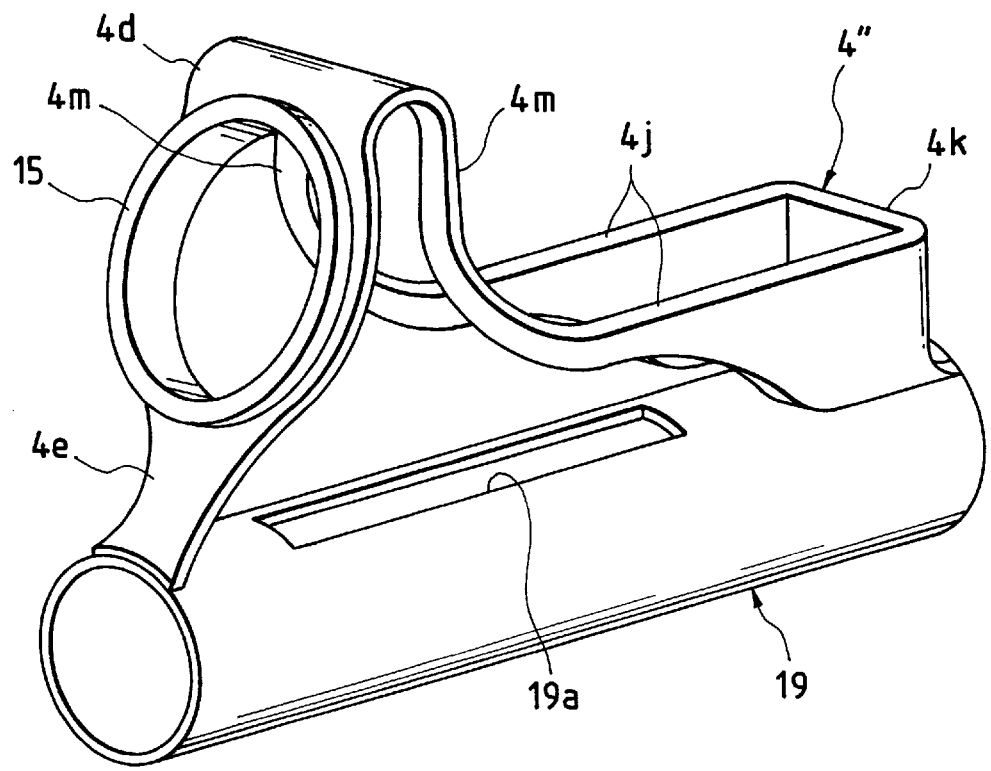
FIG. 9 is perspective view of a fishline lead-in guide member according to a third embodiment of the invention.

FIG. 9 is a perspective view of a fishline lead-in guide member 4" as a third embodiment of the present invention. According to the third embodiment of the invention, a cylindrical body 19 in place of the leg portions 4c, 4f of the fishline lead-in guide member 4" according to the second embodiment of the invention is integrally fixed by welding, for example. The butt grip 1 is fitted in the cylindrical body 19 and then a fishline lead-in hole 19a in the longitudinal direction of the cylindrical body 19 is mated with the fishline lead-in guide 3. The remaining configuration is substantially the same as that of the second embodiment of the present invention.

The cylindrical body 19 may be secured to the fishline lead-in guide member 4 according to the first embodiment of the invention likewise.

One or both ends of each of the leg portions 4c, 4f of the aforementioned fishline lead-in guide members 4, 4" may be bent so as to be retained by a slot extended in the circumferential direction and provided in a low upright bar along the outer circumferential direction of the butt-grip 1. Further, through-holes may be bored in the leg portions 4c, 4f so as to retain the leg portions thereby with machine screws.

Although a spinning rod has been shown in the drawings, the present invention is also applicable to a fishing rod of such a type that middle sections of the rod are coupled to the front of the butt grip 1 in parallel.

The arm portions (4a or 4j) of the fishline lead-in guide member according to the aforementioned embodiment of the invention may be formed so as to cover the fishline lead-in guide 3 from above and simultaneously abut thereagainst for the purpose of protecting the fishline lead-in guide 3. Moreover, the opening (having the width α) formed by the arm portions may be used simultaneously as the fishline lead-in guide 3 by making the opening formed thereby substantially conform to or otherwise slightly smaller than the slot 1a of the fishing rod. In that case, the fishline lead-in guide 3 as a separate member can be dispensed with.

Further, the fishing rod described above may be used as not only what is defined by the present invention but also a conventional fishing rod equipped with a fishline guide installed outside the rod by letting the front (in the direction of tip end) of the guide ring of the fishline lead-in guide member according to each of the aforementioned embodiments of the invention have an open structure so as to set the connecting portion 4b (or 4k) lower in height than the guide ring.

Figure 10:
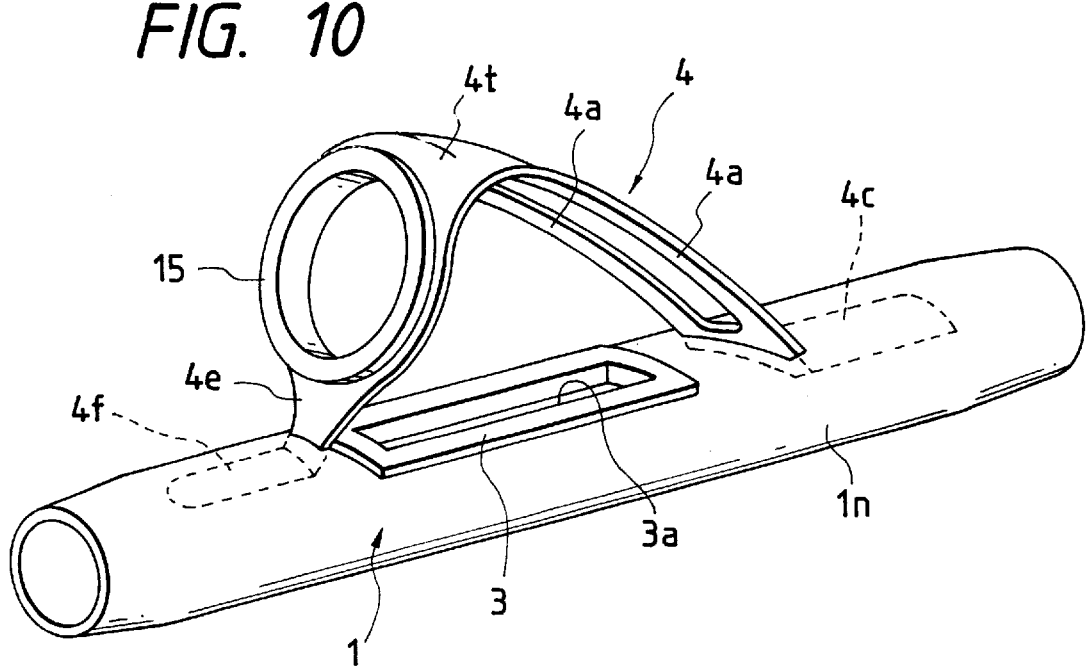
FIG. 10 is perspective view of the principal part according to a fourth embodiment of the invention.

FIG. 10 refers to a fourth embodiment of the present invention. The guide ring 15 is fixed to the fishline guide portion 4e of the fishline lead-in guide member 4 and the two arm portions 4a on the front side of the fishline lead-in guide member 4 tilt down forward via its top 4t without being twisted. The leg portion 4c on the front side and the leg portion 4f in the rear of the fishline guide portion 4e are buried into the thick-wall portion 1n of the butt grip 1. The fishline lead-in guide 3 which forms the fishline lead-in hole 3a in front of the guide ring 15 is uniformly buried into the thick wall portion 1n, so that it is protected from an external impact. Although it is preferred to provide a slot as the fishline lead-in hole 3a, moreover, a circular or tubular hole may otherwise be used for the purpose.

The leg portions 4c, 4f are fixed by winding a string (thread) thereon or fixed with machine screws, an adhesive or the like. Further, they are covered with synthetic resin or fiber reinforced synthetic resin and buried to harden the coating so as to produce a thick-walled fishing rod. Thus the fixed strength as well as a feeling of identification with the fishing rod is improved. In addition to the fact that the fixed strength of the fishline lead-in guide member 4 is improved, the following contrivance has been made in order to protect the guide ring 15 and the butt grip 1 by easing an impact when the fishing rod is dropped. More specifically, the top 4t and its neighborhood are formed by drawing to obtain a three-dimensional configuration first. Further, booth arm portions 4a are formed without twisting, so that they are easily bent against the force applied in the diametric direction directed from the top to the butt grip 1. Even though the fishing rod is dropped or an impact acts on the top 4t of the fishline lead-in guide member 4, the top itself is hardly deformed and the guide ring 15 positioned at a level lower than that of the top is protected and besides the impact force at that time is therefore absorbed by the deflective deformation of both arm portions 4a. If, further, the arm portions are easily deformable, they hardly constitute resistance when the fishing rod is bent and the rhythm or flexibility of the fishing rod becomes maintainable.

Figure 11:
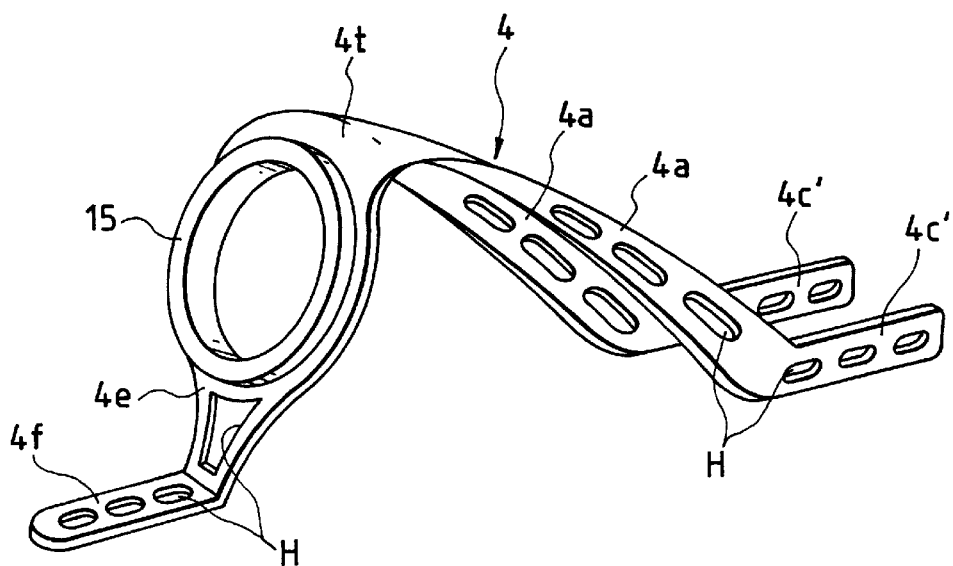
FIG. 11 is perspective view of a fishline lead-in guide member according to a fifth embodiment of the invention.

FIG. 11 refers to a fishline lead-in guide member 4 as a fifth embodiment of the present invention. The fishline lead-in guide member can be made lightweight by making punched holes H in the leg portions 4c', 4f, arm portions 4a and fishline guide portion 4e of the fishline lead-in guide member 4 as shown in FIG. 11; thus improvement in designing fishline lead-in guide members is also achievable. Further, the presence of punched holes H in leg portions may contribute to improving leg-to-rod fixed force if synthetic resin fixing material is put into the punched holes H and solidified.

Although a description has been given of a case where a sheet metal is punched by a press into the body of the fishline lead-in guide member 4 in order to simplify the working and reduce cost, wire may be used to form the fishing rod of FIG. 10. Further, spring material or shape-memory alloy may also be used to form fishing rods including what is shown in FIG. 11.

Since the slit 1a for mounting the fishline lead-in guide 3 for forming the fishline lead-in hole 3a is provided in the butt grip 1, the strength of the butt grip 1 on the side of the slot 1a tends to decrease. For this reason, impact and hold-down force act on the slot side inherently weak in resistance thereto when such impact and hold-down force are applied from the outside and the butt grip 1 is prone to damage if the leg portion of the fishline lead-in guide member 4 is fixed in the same angular positional area as that of the slot of the fishing rod. In order to protect the butt grip 1 by dispersing the force into another side, the leg portion on the front side is divided into two leg portions 4c' (the two leg portions are formed for each arm portion 4a) and the leg portions are made to abut against the neighborhood with the angular position shifted from the slot on the side of the butt grip 1 before being fixed thereto. Otherwise, the leg portion 4f on the rear side may be so divided.

Figure 12:
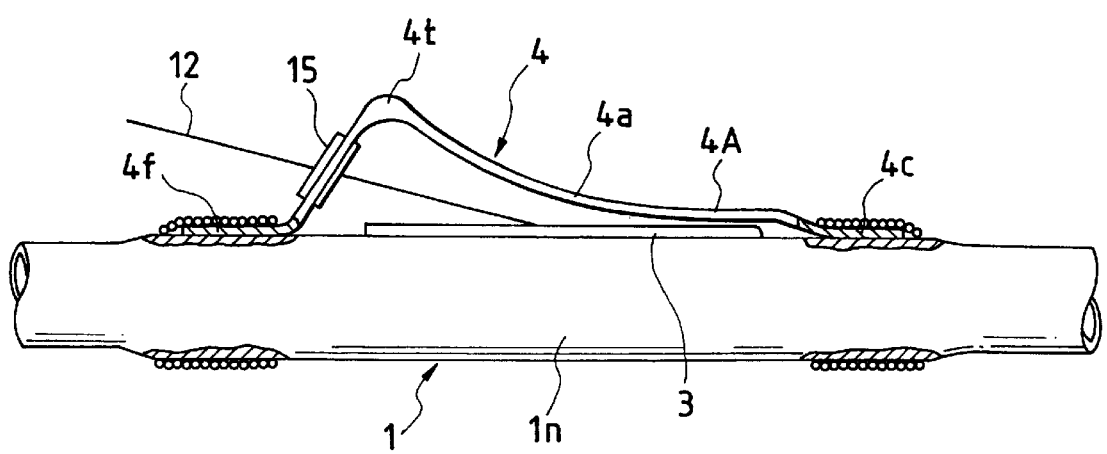
FIG. 12 is side view of the principal part according to a sixth embodiment of the invention.

FIG. 12 refers to a sixth embodiment of the present invention. The top 4t of the fishline lead-in guide member 4 is projected upward and formed three-dimensional, so that it is hardly deformable. The rear side of the fishline lead-in guide member 4 sharply tilts and is fitted with the guide ring 15, whereas the arm portions 4a on the front side has a convex surface on the fishing rod side, that is, a concave surface on the other side. The forward portion 4A of the concave surface is formed in substantially parallel to the fishline lead-in guide 3 or gently sloped. Further, the gap between the portion 4A and the fishline lead-in guide 3 is small or so small that both of them are in intimate contact with each other. The thick-walled portion 1n of the fishing rod is used to hold the fishline lead-in guide 3 and fix the leg portions 4c, 4f of the fishline lead-in guide member 4.

Even if force is applied to the top 4t of the fishline lead-in guide member 4 as the fishing rod is dropped, the concave arm portions 4a is deformed to absorb the force applied. Since the forward portions of the arm portions 4a are in contact with the fishline lead-in guide 3 supported by the thick-walled portion 1n or otherwise have a small gap with respect to the fishline lead-in guide 3, the forward portions thereof bear the deformation of the arm portions 4a, prevent the arm portions 4a from permanent deformation and leave them in the state of elastic deformation. As the arm portions are easily deformable, the fishing rod is kept in moderate condition.

The provision of the laterally divided two arm portions as shown in FIGS. 10 and 11 allows the upper side of the fishline lead-in hole of the fishline lead-in guide to be kept open and this makes it easier to pass the fishline therethrough and manipulate the fishline. In this case, the forward portions 4A of the arm portions may be allowed to abut against the respective upper lateral faces of the fishline lead-in guide 3 to increase their strength against the hold-down load or to be pressed against a flexible member to be provided in this portion.

Figure 13:
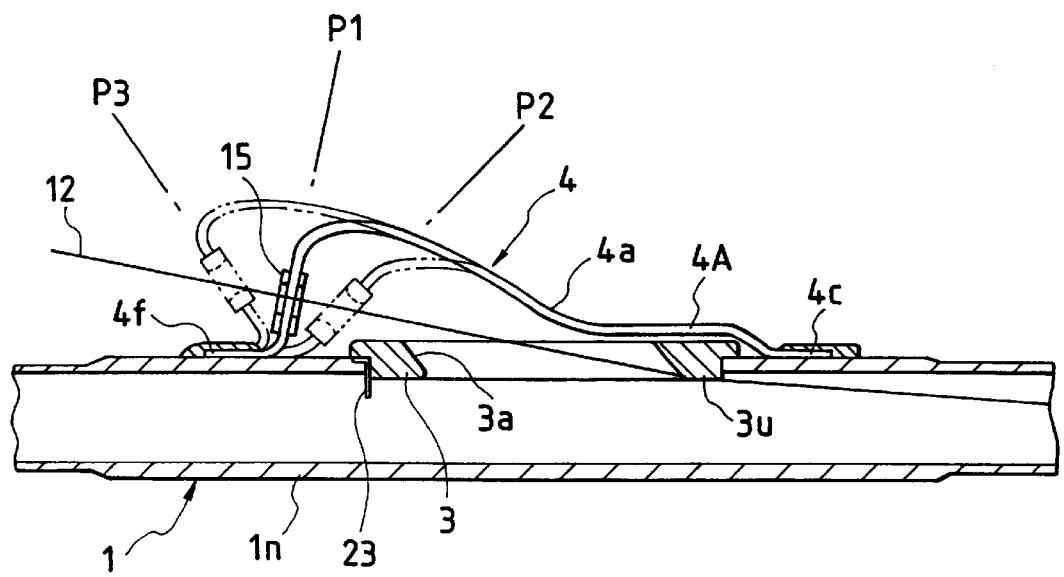
FIG. 13 is vertical sectional view of the principal part according to a seventh embodiment of the invention.

FIG. 13 refers to a seventh embodiment of the present invention. A slot is formed in the thick-walled portion 1n of the butt grip 1 and a ceramic fishline lead-in guide 3 is fitted in this slot and the fishline lead-in hole 3a having a guide face tilting forward is formed in this fishline lead-in guide. The underside 3u of the fishline lead-in guide is protruded from the inner face of the fishing rod to guide the fishline 12 in such a manner as to prevent it from making contact with the inner face of the fishing rod; however, the degree of making the underside thereof protrude therefrom is minimized so that the retraction of the middle section of the fishing rod is kept unhampered. When the middle section of a spinning rod is pulled out after it is retracted with the fishline 12 passed therethrough, the middle section may be pulled out in such a state that the fishline has wound itself round the surface of the middle section, for example, and consequently the fishline may eat into the coupling joint at the tip end of the fishing rod. In order to prevent such an occurrence, a brush 23 for sweeping the fishline in the middle section may be installed in the butt grip. If, however, such a brush is held between the slot wall and the rear end of the fishline lead-in guide 3 when the fishline lead-in guide 3 is fitted in the slot or the like as shown in FIG. 13, it will be much more manhour-saving than holding such a brush in a new place.

The fishline lead-in guide member 4 is disposed so as to stride over the fishline lead-in guide 3. In such a state P1 that the tilted angle of the rear guide ring 15 is in the range of substantially 90°±15° with respect to the forward direction of the butt grip 1, however, it is an angle at which the guide ring 15 substantially intersects the fishline 12 on which tension has acted. Even though the hole diameter of the guide ring 15 is small, the opening is still wide enough for the fishline to be passed therethrough and therefore the fishline is hardly allowed to contact the guide ring, so that the fishline is guided smoothly as its resistance is reducible.

In such a state P2 that the tilted angle of the guide ring 15 is in the range of substantially 45°±30° with respect to the forward direction of the butt grip 1, the tilted angle of the fishline 12 with respect to the butt grip 1 is made reducible by setting the guide ring closer to the fishline lead-in guide 3. The fishline can thus be introduced smoothly. Even when the fishline flows forward from above the guide ring, the fishline is prevented from being caught by the fishline lead-in guide member 4 and smoothly introduced therein. Further, fishline lead-in guide member can easily be made compact and lightweight because the height and size of the portion protruded between the fishline lead-in guide 3 and the guide ring are reducible by decreasing the distance therebetween.

In such a state P3 that the tilted angle of the guide ring 15 is in the range of substantially within 30° to 80° with respect to the backward direction of the butt grip 1, there may be provided a distance or a space between the fishline lead-in guide 3 and the guide ring 15, so that the fishline 12 is readily taken in and out up or to the side of the fishline lead-in guide. Further, the leg portion 4f of the fishline lead-in guide member 4 can be disposed comparatively closer to the fishline lead-in guide 3 when it is taken into consideration that the guide ring 15 is set apart from the fishline lead-in guide 3. Thus the leg portion is prevented from being projected backward from the fishing rod.

In the cases of aforementioned states P1, P2, P3, the fishline lead-in guide member 4 has two arm portions 4a distributed laterally, which is intended to make easier the operation of passing the fishline through the fishing rod. However, it is still acceptable to form one arm portion capable of covering the fishline lead-in hole 3a.

Figure 14:
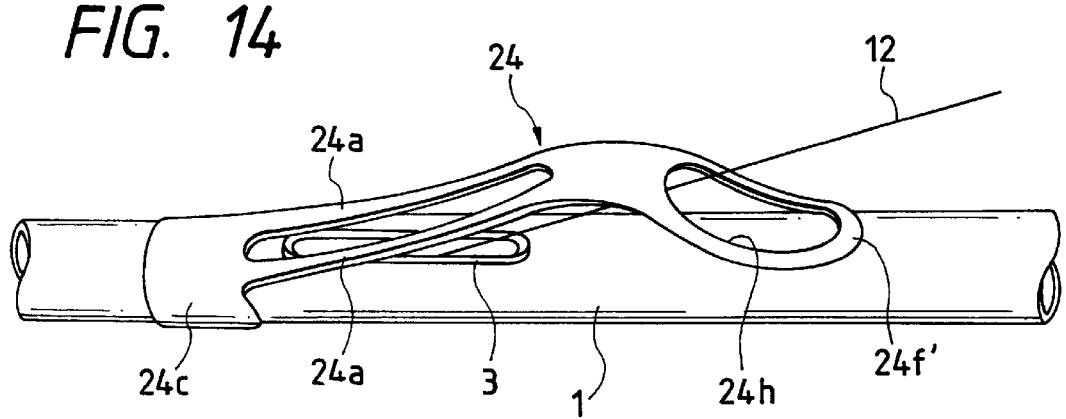
FIG. 14 is perspective view of the principal part according to an eighth embodiment of the invention.

FIG. 14 refers to an eighth embodiment of the present invention. A fishline lead-in guide member 24 prepared by cutting a sheet metal into the shape of a bridge is disposed in such a way as to cover the fishline lead-in guide 3 mounted on the slot formed in the butt grip 1. The fishline lead-in guide member 24 is fixed with a tubular portion 24c at the front end of the fishline lead-in guide member as a leg portion, whereas the read end portion 24f' thereof is made slidable. The rear end portion 24f' need not be kept contacting the butt grip 1 and may be set afloat or fixedly secured thereto. A guide hole 24h is formed in the rear of the fishline lead-in guide member 24 and the fishline 12 is introduced via this hole into the fishline lead-in hole of the fishline lead-in guide 3. Further, the upper side of the fishline lead-in hole is opened as lateral arm portions 24a are separated and the fishline can easily be manipulated accordingly.

A split is formed in the tubular portion, which is then held on the butt grip 1 with proper pressure. In this case, the fishline lead-in guide member 24 may be arranged so that it is longitudinally movable to make the longitudinal position of the guide hole 24h adjustable with respect to the fishline lead-in hole. Even though the angle of introducing the fishline 12 varies with the height or the size of the reel, the fishline 12 kept under tension can be so adjusted as not to contact the guide hole 24h. The peripheral edge of the guide hole may be coated with an abrasion resistant member and the guide hole may have a diameter larger than the width of the fishline lead-in hole to prevent strong force from acting on the guide hole and to make the fishline lead-in guide receive the strong force applied by the fishline 12 kept under tension. The guide hole 24h may be slot-like or circular.

Figure 15:
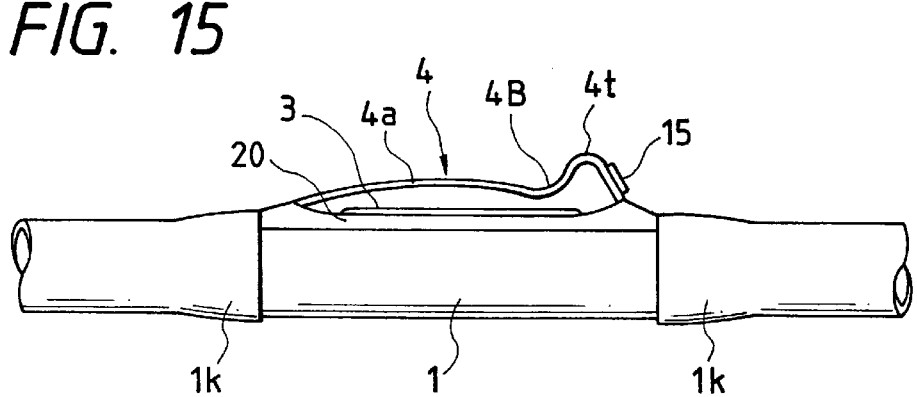
FIG. 15 is side view of the principal part according to a ninth embodiment of the invention.

FIG. 15 refers to a ninth embodiment of the present invention. The leg portions in front of and behind the fishline lead-in guide member 4 and the fishline lead-in guide 3 are held with a member 20 having an impact absorbing property such as rubber, elastomer, soft resin or the like and fixed to the butt grip 1 via that member 20. In order to fix the leg portions, a thread is wound on the butt grip 1 together with an area where the longitudinal leg portions of the fishline lead-in guide member 4 are held by the member 20 and further the winding is impregnated with an adhesive or the like as a fixing material to form fixing portions 1k.

On the other hand, a portion 4B immediately before the top 4t of each of the arm portions 4a of the fishline lead-in guide member 4 is convex-shaped toward the butt grip and the front side of the portion 4B is gently convex-shaped upward, so that the arm portions 4a as a whole are S-shaped. Even if an impact load is applied to the top of the fishline lead-in guide member 4 because the fishline is dropped, the load is absorbed by not only the elasticity of the member 20 but also the deformation of the S-shaped arm portions 4a. As the guide ring 15 is set lower than the top 4t, it is prevented from being damaged.

Figure 16:
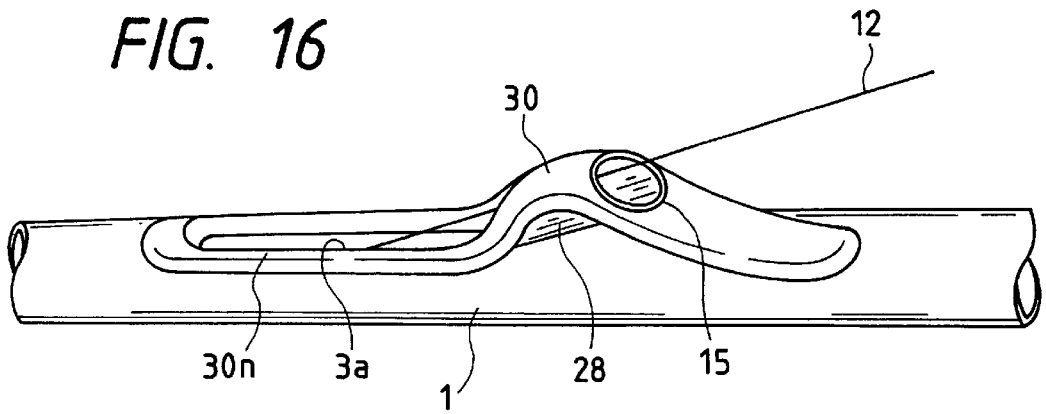
FIG. 16 is perspective view of the principal part according to a 10th embodiment of the invention.
Figure 17:
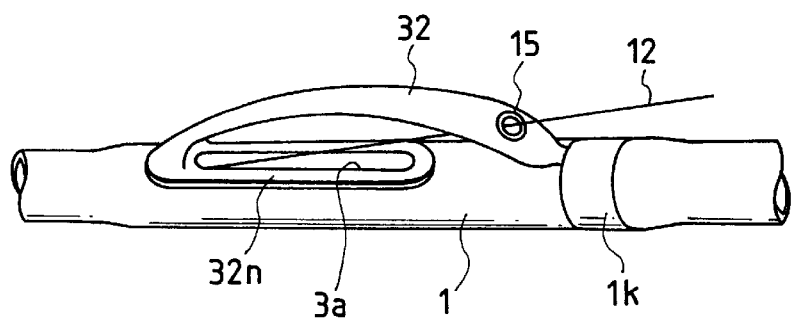
FIG. 17 is perspective view of the principal part according to an 11th embodiment of the invention.
Figure 18:
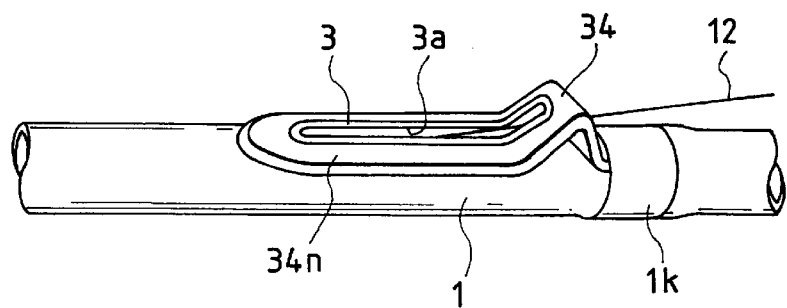
FIG. 18 is perspective view of the principal part according to a 12th embodiment of the invention.

FIGS. 16 to 18 refer to a 10th to a 12th embodiment of the present invention wherein, for example, the fishline lead-in guide member 4 is shown to be integral with the fishline lead-in guide 3. In the case of each combination mentioned above, it is possible to reduce manufacturing cost as the number of parts is small while parts control and assembling are simplified. According to not only the aforementioned embodiments (excluding what is shown in FIG. 9) of the present invention but also this embodiment thereof, moreover, use of parts common to the fishline lead-in guide member and the fishline lead-in guide (or parts for making them integral with each other) is possible, irrespective of the size of the butt grip 1. More specifically, if the width of the leg portions of the fishline lead-in guide member is reduced or if a thinner sheet metal is used to form the fishline lead-in guide member, they will readily fixed by making use of the winding force of the thread along the curved surface of the butt grip. If, moreover, the fishline lead-in guide is formed substantially synchronously with a small-diameter butt grip, there will arise no inconvenience even when it is mounted on a large-diameter butt grip because a small gap, even though such a gap is produced, between the surface of the butt grip and the fishline lead-in guide can be filled up with, for example, an adhesive. Thus parts for common use may be used.

In the case of a fishline lead-in guide member of FIG. 16, a tubular guide 28 is passed through an S-shaped fishline lead-in guide member body 30 and the guide ring 15 made of ceramics or the like is mounted at the opening at its rear end. The forepart 30n of the fishline lead-in guide member body 30 is a fishline lead-in guide portion fitted in a slot formed in the butt grip 1, so that the fishline lead-in hole 3a is formed. The positions of the fishline lead-in hole 3a and the guide ring 15 are determined by fixedly holding the forepart 30n of the fishline lead-in guide member body 30, whereby no adjustment is needed. The fishline lead-in guide member body 30 may be made of metal, synthetic resin, ceramics, fiber-reinforced synthetic resin or the like.

In the case of a fishline lead-in guide member of FIG. 17, a horn-shaped fishline lead-in guide member body 32 is formed as the nucleus and its one end is mounted in a slot provided in the butt grip 1 to provide a fishline lead-in guide portion 32n for forming the fishline lead-in hole 3a, the remainder mostly arcuate being used to form a bridge over the fishline lead-in guide member body 32. The rear end portion the fishline lead-in guide portion 32n is fixed with a thread which is wound thereon and the winding is impregnated with an adhesive or the like, so that the fixing portion 1k is formed. Further, the guide ring 15 is positioned at a proper height in the rear of the fishline lead-in hole 3a. It is unnecessary in this case to fix the fishline lead-in guide portion 32n with an adhesive or the like. On the fishline lead-in guide portion 32n may be fixed with an adhesive while the fixing portion 1k is dispensed with. The fishline lead-in guide member body 32 is formed of a material similar to what is defined in reference to FIG. 16.

In the case of a fishline lead-in guide member of FIG. 18, a lead-in guide member body 34 having a chevron portion is formed as the nucleus and its forepart forms a fishline lead-in guide holding body 34n mounted in a slot provided in the butt grip 1, the fishline lead-in guide 3 made of ceramics or the like being fitted to its inner periphery to form the fishline lead-in hole 3a. The rear portion of this fishline lead-in guide 3 tilts upward and fits in a guide hole provided in the chevron portion of the fishline lead-in guide member body 34, whereby the fishline 12 can be introduced diagonally from the rear side into the butt grip. The fixing portion 1k is similar to what is shown in reference to FIG. 17. The fishline lead-in guide member body 34 is formed of a material similar to-what is defined in reference to FIG. 16.

Figure 19:
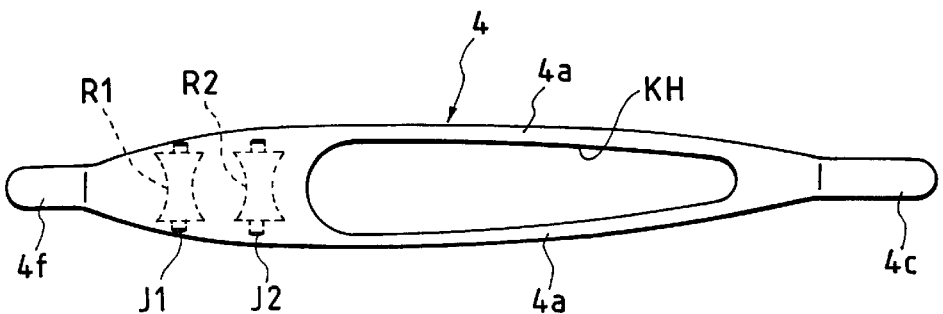
FIG. 19 is plan view of a fishline lead-in guide member according to a 13th embodiment of the invention.
Figure 20:
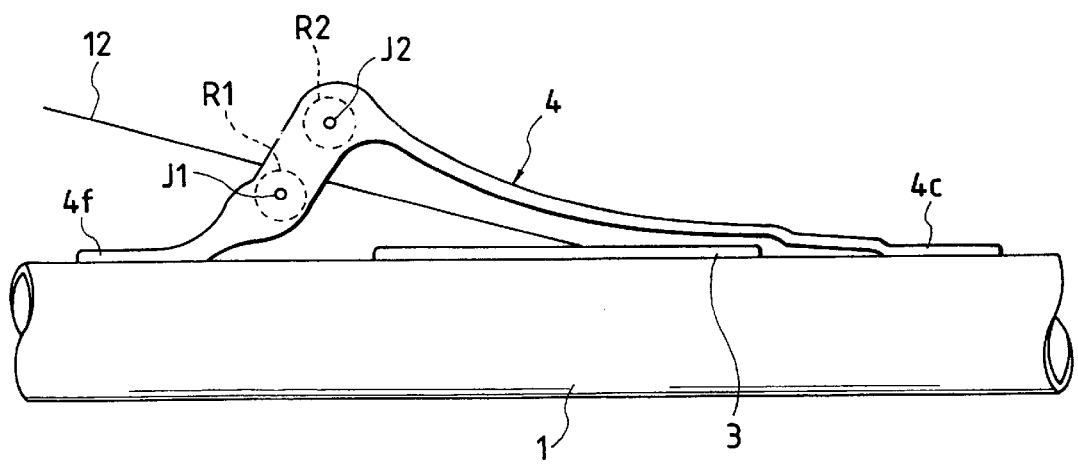
FIG. 20 is side view of the principal part of the fishing rod fitted with the fishline lead-in guide member of FIG. 19.
Figure 21:
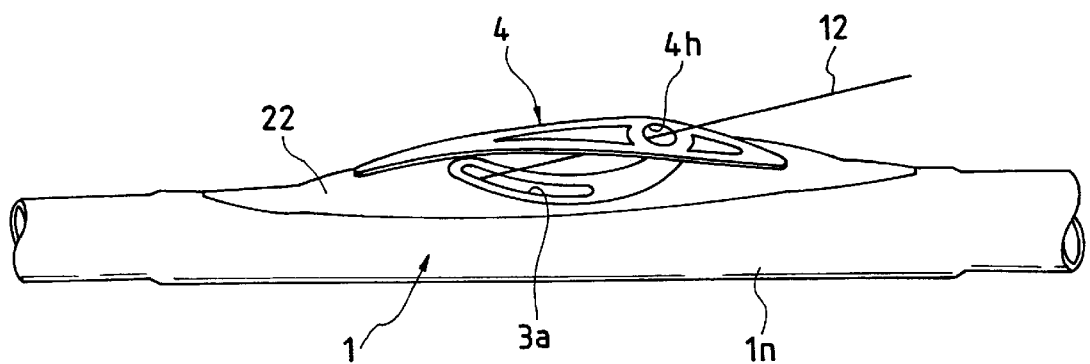
FIG. 21 is perspective view of the principal part according to a 14th embodiment of the invention.

FIGS. 19, 20 refer to a 13th embodiment of the present invention. FIG. 20 is a side view of a fishline lead-in guide member 4 mounted on the butt grip 1 and FIG. 19 a plan view of the fishline lead-in guide member 4. This embodiment of the present invention features that two rollers R1, R2 in place of the guide rings described in the preceding embodiments thereof are installed in the rear position of the fishline lead-in guide 3, these rollers being rotatably supported by driving shafts J1, J2, respectively. Therefore, the resistance of the fishline 12 that is introduced and guide is minimized. The arm portions 4a are formed with a large space held therebetween so as to form a long open portion KH above the fishline lead-in guide 3. However, this arrangement is not restrictive in that one arm portion instead may by provided in combination with the rollers FIG. 21 refers to a 14th embodiment of the present invention. The fishline lead-in guide member 4 is in a gentle arcuate form, and front and rear leg portions are buries into a base portion 22 made of synthetic resin, fiber reinforced synthetic resin or the like. The leg portions may be thus buried simultaneously when the base portion is formed or may be made integral with a soft member used for a padding later. Moreover, the open portion of the fishline lead-in hole 3a is formed like a forwardly-turning-up slot which is formed in the base portion 22, so that the fishline lead-in hole 3a is protected. A guide hole 4h is provided in the rear position of the fishline lead-in hole 3a. Holes are also made in front of and behind the guide hole for the purpose of reducing weight.

The leg portions are buried up to the base portion 22 or the thick-walled portion in of the butt grip 1. However, the leg portions are not buried in the butt grip body excluding the thick-walled portion to maintain the strength of the butt grip. The fishline lead-in hole 3a is formed in the butt grip 1 and though this allows the strength of the butt grip to be lowered, yet the strength is prevented from being lowered further. The fishline lead-in guide member 4 may be buried and fixedly formed beforehand and then assembling parts may be fixedly joined to the thick-walled portion 1n of the butt grip. The formation of the fishline lead-in guide member 4 by burying like that improves the strength of the fixed portion, which allows the fishline lead-in guide member 4 as well as the fishline lead-in hole 3a to be protected as described above in proportion to the quantity of buried thickness; thus improvement in designing fishline lead-in guide members is also achievable.

Figure 22:
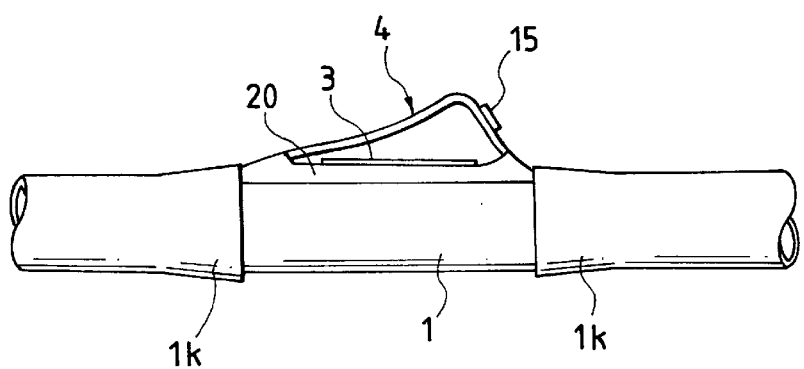
FIG. 22 is side view of the principal part according to a 15th embodiment of the invention.

FIG. 22 refers to a 15th embodiment of the present invention wherein it is intended to explain that the structure of fixedly holding the fishline lead-in guide member 4 and the like described in reference to FIG. 15 is irrelevant to the configuration of the fishline lead-in guide member 4. More specifically, the fishline lead-in guide member 4 need not necessarily be so structured as to readily absorb an impact load by its deflective deformation. According to this embodiment of the invention, the fishline lead-in guide member 4 is so structured as to hold the leg portions on both end sides of the fishline lead-in guide member 4, the fishline lead-in guide 3 with the member 20 capable of absorbing impact force such as rubber, elastomer, soft resin or the like and besides the fishline lead-in guide member 4 is fixedly held on the butt grip 1 via the member 20. This member 20 is allowed to absorb the impact given to the fishline lead-in guide member 4 when the fishing rod is dropped, so that the fishline lead-in guide member 4 and the fishline lead-in guide 3 can be protected. Moreover, the butt grip 1 itself can be protected. Particularly, the fixing portions 1k used to fixedly hold both the leg portions of the fishline lead-in guide member 4 are prevented from being peeled off and damaged.

Figure 23:
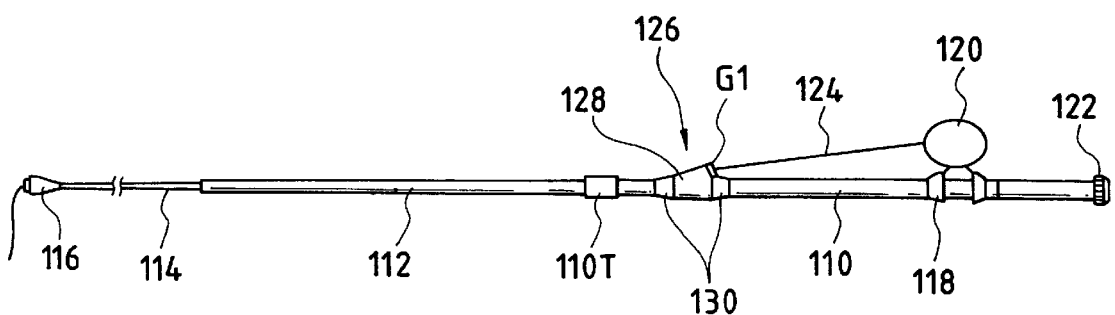
FIG. 23 is side view of a fishing rod allowing a fishline to pass through as a 16th embodiment of the present invention.

FIG. 23 shows an example of a spinning rod allowing a fishline to pass through according to a 16th embodiment of the present invention. As shown in FIG. 23, a middle section 112 of the fishing rod is joined to a coupling portion 110T at the tip end of a butt grip 110 and further a tip section 114 is joined to the combination of the middle section and the butt grip 110. A top guide 116 is fitted to the tip end, whereas a butt cap 122 is fitted to the rear end of the butt grip 110. Further, a reel leg fixing unit 118 for fixing a reel 120 is fitted to the butt grip 110 and a fishline lead-in portion 126 is provided ahead of the reel leg fixing unit.

Figure 24:
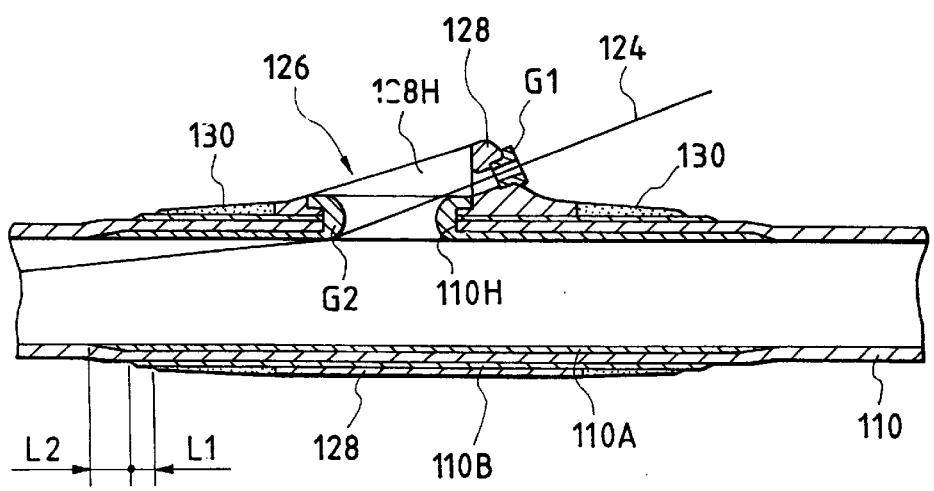
FIG. 24 is enlarged vertical sectional view of the principal part of FIG. 1.

FIG. 24 is an enlarged vertical sectional view of fishline lead-in portion 126 and in reference to FIG. 24, a hole 110H of predetermined size is made in the butt grip 110. Further, a plastic tubular frame body 128 or what is made of fiber reinforced resin, for example, and fitted with a fishline guide G1 formed of a hard member such as ceramics, metal or the like is securely fitted to the periphery of the hole 110H. A fishline guide G2 made of the same material is inserted and secured to the hole 110H, which is open upward to form an opening 128H. While tension is applied to a fishline 124, the fishline 124 is allowed to contact only the fishline guides G1, G2. The tubular frame body 128 also acts as a member for making up the insufficient strength of the peripheral portion of the hole originating from the hole 110H bored in the butt grip 110. In addition, an inner and an outer reinforcing layer 110A, 110B as reinforcing members are provided on the inner and outer peripheries of the butt grip 110, respectively.

A tubular or sheet material may be used for those reinforcing layers. In particular, the tubular member is conveniently usable as the inner reinforcing layer 110A in such a manner as to encase a core bar at the time of forming. As the material therefor, use can be made of woven fabric of glass fiber, carbon fiber or organic fiber (or what is impregnated with resin as prepreg), metal net or the like. Use of such a woven fabric is preferred because burrs and splits are substantially prevented during machining. As the expansion and contraction coefficients of the inside are smaller than those of the outside when the fishing rod is bent, any fiber having a higher elastic modulus may be used for the inner reinforcing layer 110A as compared with the outer reinforcing layer 110B. However, it is still preferred to use a material having a lower elastic module than that of the butt grip for reinforcing purposes because the bending property is less impaired.

The peripheral portion of the hole is thus reinforced by increasing the wall thickness or using a woven fabric or a net.

Although the tubular frame body 128 has been formed of synthetic resin, it may be formed of fiber reinforced resin. The position of the fishline guide G1 for introducing the fishline 124 from the outside is set higher enough for the fishline 124 not to touch the outer periphery of the butt grip.

The flexural rigidity of the reinforced area is caused to increase and the smooth bending of the fishing rod is not attainable by simply making up the insufficient strength of he butt grip 110 by utilizing the presence of the hole 110H; that is, a dogleg bending occurs, whereby stress is concentrated in a place where the rigidity sharply changes. Therefore, auxiliary reinforcing tubular bodies 130 are arranged continuously in front of and behind the tubular frame body 128 in the longitudinal direction. The auxiliary tubular body 130 is formed in that its wall thickness is reduced toward its end portion. Synthetic resin softener than what is used for the tubular frame body 128, rubber, natural material such as wood or less elastic fiber reinforced resin is used to form the auxiliary tubular bodies 130 so as to make the flexural rigidity lower than that of the end portion of the tubular frame body 128. Further, the flexural rigidity is gradually decreased toward the end portion of the tubular frame body 128, whereby the stress concentration is prevented and the bending action is smoothed.

In the structure in which the wall thickness of only the hole 110H side of the fishing rod is to be increased for reinforcing purposes, only an upper side member in place of the auxiliary tubular bodies 130 is sufficient.

If, moreover, the inner reinforcing layer 110A and the outer reinforcing layer 110B are separated by a distance L2 as shown in FIG. 24 and if the outer reinforcing layer 10B and the auxiliary tubular bodies 130 are separated by a distance L1, it is possible to ease the variation of flexural rigidity, reduce the stress concentration and smooth the bending of the fishing rod.

Figure 25:
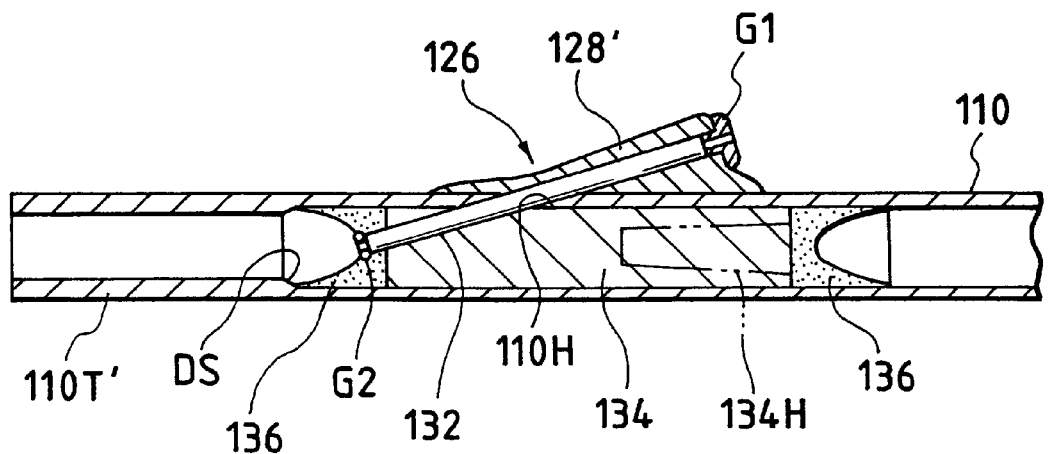
FIG. 25 is side view of a 17th embodiment of the present invention.

FIG. 25 refers to a 17th embodiment of the invention, wherein a tubular guide pipe 132 is inserted in the hole 110H provided in the butt grip 110. This tubular guide pipe 132 is held by a plate-like or semi-tubular frame body 128' and secured to the peripheral area of the hole 110H on the outer periphery of the butt grip. An inner reinforcing body 134 is securely disposed in the inner area in the vicinity of the hole 10H and by this inner reinforcing body 134, the insufficient strength of the fishing rod because of the presence of the hole 110H is made up. Although the tubular guide pipe 132 is passing through this reinforcing body, the guide pipe 132 may be dispensed with. The butt grip, the reinforcing body and the oblique hole for the guide pipe may be subjected to hole boring individually after the injection molding of the resin-made frame body 128'. However, the hole and the guide pipe can be made to conform in size to each other by boring the hole therethrough after the frame body is bonded to the butt grip 110; the advantage includes rendering the hole substantially smaller, improving the strength and reducing the necessity of reinforcement.

Although the inner reinforcing body 134 may be formed of fiber reinforced resin, metal or the like, it is preferred for the inner reinforcing body to be formed of a material having a lower elastic modulus other than the reinforced fiber of the butt grip body in order to reduce the flexural rigidity of the fishline lead-in portion and make it easily bendable. If the inside of the butt grip is thus reinforced, a fishing rod which is thinner and excellent in external appearance may be provided.

Notwithstanding, the hole 110H for use in introducing the fishline is needed to pass the tubular guide pipe 132 therethrough, whereas the tubular guide pipe is required to pass the fishline therethrough, which means the diameter size has a lower limit. Therefore, the strength of the butt grip may be extremely lowered because of the provision of the hole 10H in a case where the inner diameter of the butt grip 110 is very small. Since the reinforcing body is disposed on the inner side of the butt grip body, the expansion and contraction of the reinforcing body are smaller than those of the butt grip when it is bent. Consequently, even though a material having an elastic modulus higher than that of the reinforced fiber of the butt grip body is used for the reinforcing body 134 in the case of a small-diameter fishing rod, the flexural rigidity would not become greater so much. Then the use of such a material having an elastic modulus higher than that of the reinforced fiber of the butt grip body allows the butt grip to be greatly reinforced, whereby the reinforcing member can be dispensed with or otherwise made smaller on the exterior of the butt grip with a relatively large hole 110H. Therefore, a slender fishing rod having an excellent external appearance can be formed.

The aforementioned inner reinforcing body 134 can be made hollow as indicated by 134H or otherwise disposed only on the side where the hole 110H exists (upper side of FIG. 25) but not on the opposite side (lower side). In order to prevent the stress concentration and make smooth bending obtainable, a reinforcing body 136 is continuously disposed in the longitudinal direction of the inner reinforcing body 134 and the outer periphery thereof is secured to the inner face of the butt grip. As shown in FIG. 25, the wall thickness of this reinforcing body is gradually decreased toward its end portion. A material similar to what is used according to the first embodiment of the invention may be used for the reinforcing body 136 to make the flexural rigidity lower than that of reinforcing body 134. Needless to say, as in the case of the first embodiment of the invention, the rigidity may be lowered only by the thickness of the reinforcing body and so on. Incidentally, 110T' represents a parallel coupling portion and a difference DS in step is intended for the inserting position of the reinforcing body 136 or the like to be determined. The inner reinforcing body 134 may be formed integrally with the butt grip 110.

Figure 26:
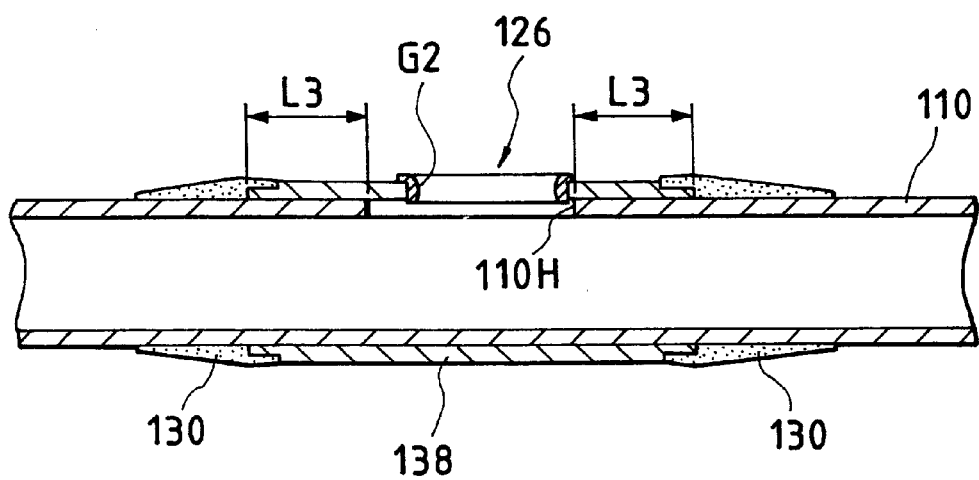
FIG. 26 is side view of a 18th embodiment of the present invention.

FIG. 26 refers to a 18th embodiment of the invention wherein the vicinity of the fishline lead-in portion 126 is depicted. A hole 110H of predetermined size is formed in the butt grip 110 and the periphery of the hole is reinforced with a high-strength tubular body 138 of metal, fiber reinforced metal or the like. The hole edge portion in the tubular body 138 may preferably be coated with an abrasion resistant material such as ceramics or fixed with a separate member G2 to reduce the resistance of the fishline. A reinforcing width dimension L3 from the edge of the hole 110H is set substantially greater than the inner diameter of the butt grip 110. Moreover, a auxiliary tubular bodies 130 similar to what is provided according to the first embodiment of the invention is used to gradually decrease not only the flexural rigidity but also the stress concentration. The auxiliary tubular body 130 is fixedly held by providing a stepwise portion of FIG. 26 in such a manner as to hold down the end portion of the tubular body 138 from the axial direction and the outside. The tubular body 38 serves as a reinforcing portion to prevent the deformation of the hole 110H because of its expansion and contraction when a bending load is applied to the butt grip 110, thus preventing the butt grip 110 from being damaged. Therefore, the tubular body 138 may be formed integrally with the butt grip on the inner side of the butt grip of the fishing rod.

In this case, a spiral fishline guide is formed on the inner face of the butt grip 110 and then the hole 110H is formed, so that the peripheral portion of the hole is internally reinforced because of the spiral fishline guide.

Figure 27:
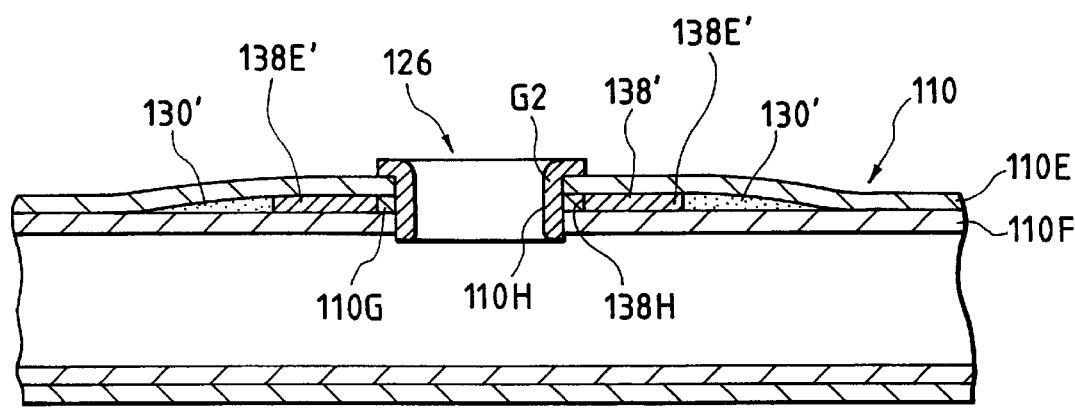
FIG. 27 is side view of a 19th embodiment of the present invention in place of what is shown in FIG. 26.
Figure 28:
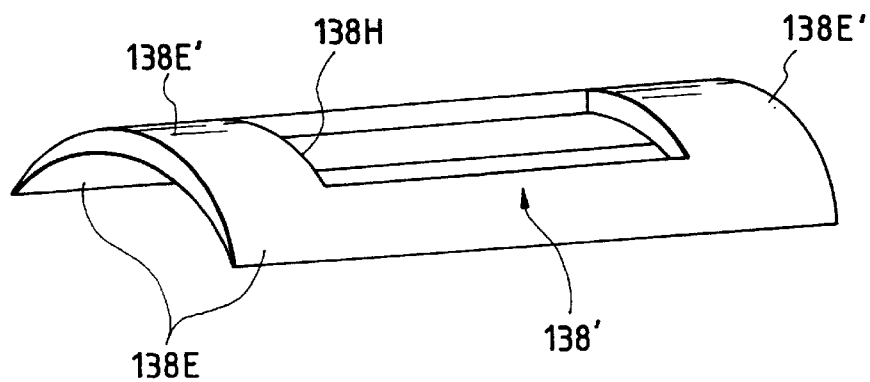
FIG. 28 is perspective view of a reinforcing part for use in FIG. 27.

FIG. 27 refers an embodiment of the present invention replacing what is represent in FIG. 26, wherein the butt grip 110 is formed integrally with an inner and an outer layer 110F, 110E that are superposed. In addition, a reinforcing member 138' such as a metal plate for preventing the peripheral portion of the hole from being destroyed or buckling is disposed in the peripheral portion of the hole 110H for the fishline guide G2 as shown in FIG. 28. Further, both end portions 138E' are followed by a reinforcing member 130' formed of a less elastic member in the longitudinal direction. The reinforcing member 130' is formed in such a manner that its thickness in the longitudinal direction is gradually decreased. Therefore, the peripheral portion of the hole 110H is reinforced and the stress concentration accompanied with the reinforcement is also prevented. In this case, 110G designates a portion formed by fiber reinforced resin prepreg of the same kind as the inner and outer layers 110F, 110E; however, it may be formed integrally with the inner and outer layers 110E, 110F by arranging the belt-like prepreg round the hole 138H of the reinforcing member 138' or otherwise disposing a rectangular prepreg for burying the hole 138H and forming the prepreg integrally with the inner and outer layers 110E, 110F before forming the hole 110H for burying the fishline guide G2.

As shown in FIG. 28, the thickness of the reinforcing member 38' is gradually decreased toward both end portions 138E in the circumferential direction, so that the rigidity is prevented from sharply varying in the circumferential direction of the butt grip 110. Toward both end portions 138E' in the longitudinal direction, the thickness may be decreased gradually like the both end portions 138E in the circumferential direction. However, as shown in FIG. 27, both end portions 138E' of the reinforcing member are preferably followed by less elastic auxiliary member 130' whose thickness is gradually decreased in the longitudinal direction so as to prevent the stress concentration. This is because the inner and outer layers are easily peeled off if the end portions 138E' of the reinforcing member 138', which are harder than the auxiliary tubular bodies 130', are pointed.

Figure 29:
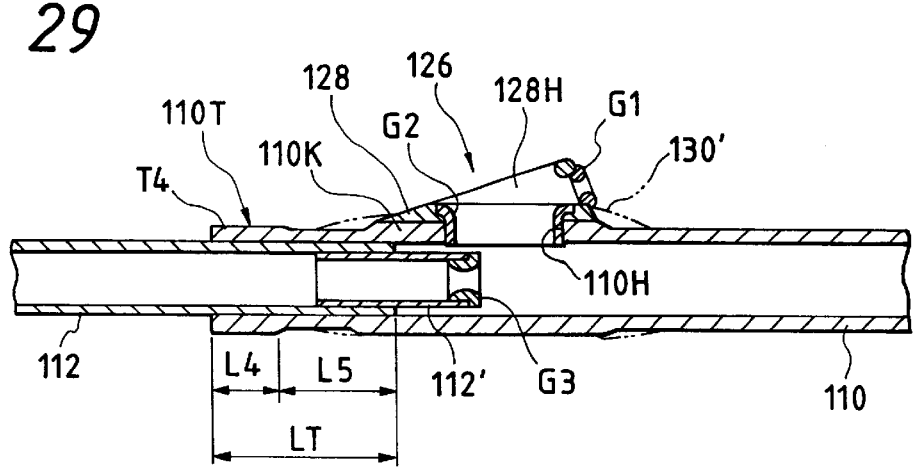
FIG. 29 is side view of 20th embodiment of the present invention.

FIG. 29 refers to a 20th embodiment of the present invention showing a spinning rod allowing a fishline to pass through wherein the fishline lead-in portion 126 is situated near the tip end of the butt grip 110. More specifically, the hole 110H of predetermined size is provided in a position ahead of the butt grip and the peripheral portion of the hole serves as a thick-walled reinforcing portion 110K. A mounting type plate-like or semi-tubular frame body 128 is secured onto the reinforcing portion. The fishline guides G1, G2 are similar to those defined according to the 16th embodiment of the invention and the opening 128H is also similar in configuration. As shown by a chain double-dashed line 130', it is preferred to provide a reinforcing body for preventing stress concentration. According to this embodiment of the invention, the coupling portion is within the range of LT in length and also extends over the thick-walled reinforcing portion 110K of the fishline lead-in portion 126. In other words, the fishline lead-in portion 126 is positioned forward to that extent.

When the middle section 112 is joined, the rear end of the coupling portion is allowed to reach the reinforcing portion 110K and the outer periphery at that rear end makes contact with and holds down the inner face of the butt grip. Since this portion serves as the reinforcing portion 110K, it has been reinforced with thick wall and fit for supporting the strength of the coupling portion. However, the rear end position of the middle section of the fishing rod needs to be positioned ahead of the hole 110H. Otherwise, the edge portion of the hole is liable to damage when a load such as fish is applied to the fishing rod as push-up force strongly acts from the rear end portion of the middle section 112 on the butt grip in the coupling area. The bending property of the reinforcing portion 110K is made improvable in comparison with its thick wall by increasing the quantity of the reinforced fiber toward the circumferential direction in comparison with the butt grip body in the rear of the fishline lead-in portion; on the other hand, its bending property can be improved by decreasing high elasticity reinforced fiber but increasing low elasticity reinforced fiber in the axial direction of the reinforcing portion.

The wall of the leading portion T4 (length range L4) of the coupling portion 110T is kept thick so as to prevent the leading end portion from splitting (vertical splitting).but the wall of the rear portion is set as thick as the butt grip of the fishing rod in the rear of the fishline lead-in portion 126. This is due to the fact that, as described above, the reinforcing portion 110K is responsible for push-up force acting on the coupling portion while the load is applied, whereas the forward thick-walled portion is responsible for preventing splitting resulting from the action of enlarging the diameter when the middle section 112 is inserted in and joined to the butt grip 110. This arrangement is satisfactory when strength is taken into consideration and thickness in other areas is kept substantially small in order to improve the bending property. Since an increase in thickness in the leading end portion is intended to prevent tear and splitting, the intended purpose is accomplished by arranging the reinforced fiber mainly in the circumferential direction and rather good bending property in comparison with the wall thickness is offered. Examples of the length of the coupling portion are as follows: the length L4 of the leading end portion: about 30 mm; and the remaining length L5 of the coupling portion: about 30 to about 130 mm.

A fishline guide G3 made of ceramics is fitted to the rear end of an auxiliary pipe 112' disposed at the rear end of the middle section 112 of the fishing rod and through this fishline guide G3 the fishline is introduced in the middle section 112. The outer periphery of the auxiliary pipe has a small diameter so that it is not forced into the fishline lead-in portion. The auxiliary pipe is made movable longitudinally with respect to the middle section and the fishline resistance can be lowered favorably on condition that it is held in a predetermined position.

In this embodiment, the fishline guide G2 is provided entirely on the inner peripheral edge of the hole 110H. However, the fishline guide G2 may be provided only on the rear side of the inner peripheral edge of the hole 110H since the fishline during fishing is guided by the fishline guide G1, the fishline guide G3 and the rear side of the fishline guide G2. In addition, if the fishing rod is constructed such that the middle section 112 can be stored into the butt section 110 in the telescopic manner, the rear side of the fishline guide G2 serves to prevent damage to the fishline when the middle section 112 is stored into the butt section 110 with the fishline extending between the fishline guides G1 and G3.

Figure 30:
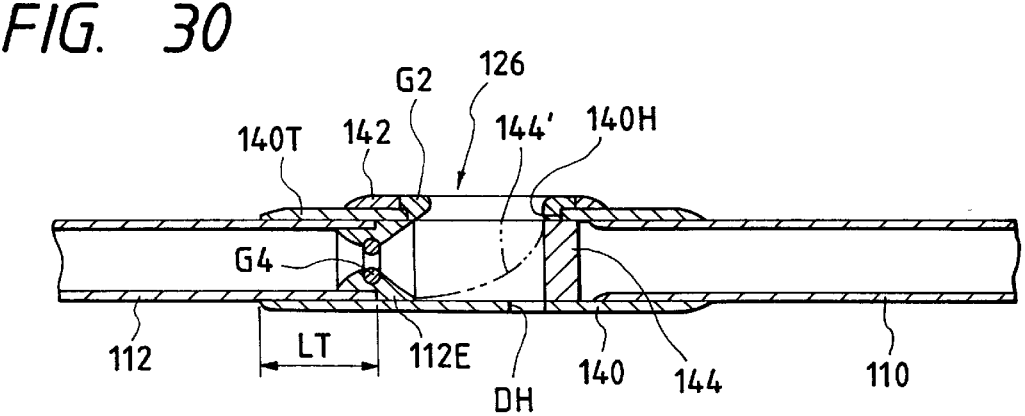
FIG. 30 is side view of 21st embodiment of the present invention.

FIG. 30 is a sectional view of the vicinity of the fishline lead-in portion of a parallel-coupling type fishing rod allowing a fishline to pass through. In the forepart of the butt grip 110, an auxiliary fishing rod 140 having a diameter larger than that of the butt grip 110 and formed with the fishline lead-in portion 126 is fitted or screwed onto the outer periphery of the butt grip. Although the auxiliary fishing rod 140 has a diameter larger than that the butt grip body, its bending property can be improved by increasing reinforced fiber in the circumferential direction or increasing high elasticity reinforced fiber but decreasing low elasticity reinforced fiber in the axial direction in comparison with the butt grip as in the case of FIG. 29. A hole 140H of predetermined size is provided in the auxiliary fishing rod 140 and since the diameter of the auxiliary fishing rod 40 is greater than that of the butt grip 110, the strength is set free from being lowered in comparison with a case where a small hole is made in the butt grip even if a larger hole is formed to reduce the fishline resistance.

The fishline guide G2 of ceramics is fitted to the hole edge and further a reinforcing portion 142 is used to reinforce the auxiliary fishing rod 140 while holding the periphery thereof. In other words, like the auxiliary fishing rod 140, the reinforcing portion 142 may be formed of fiber reinforced resin prepreg or the like so as to make up the insufficient strength of the side (upper side of FIG. 30) on which hole 40H is made; this may also formed integrally at the time of forming the auxiliary fishing rod 140. As similarly to FIG. 29 and the like, an auxiliary body may be formed to prevent stress concentration. As shown in FIG. 30, the length range LT of a coupling portion 140T is determined so that the rear end of the coupling portion of the middle section 112 is positioned in the area of the reinforcing portion 142 and as similarly to FIG. 29, the reinforcing portion 142 of the fishline lead-in portion 126 is utilized as a coupling portion likewise. The range LT is positioned on the front side of the hole 140H as similarly to FIG. 29. Although not apparent in FIG. 30, a holding body 112E for holding a ceramic fishline guide G4 has a slightly small outer diameter so as not to hold down the inner face of the auxiliary fishing rod 140.

Thus the sum of lengths of the coupling portion 140T and the fishline lead-in portion 126 can be reduced as in the case of FIG. 7 and a decrease in the area where the flexural rigidity is increased contributes to not only improving the bending of the fishing rod but also reducing manufacturing cost. A member 144 is a plug member for blocking water entering inside and discharging the water from a drain hole DH bored in the lower side of the auxiliary fishing rod 140. The front shape of the plug member 44 is formed as shown by a chain double-dashed line 144' and extended up to the lower position of the front end of the fishline guide G2 and the shape of the holding body 112E is made to correspond to the front shape of the plug member. When the fishline and the fishline threader are introduced, it is preferred that the fishline is introduced by its own wight through the fishline guide G2, the plug member and holding body 112E so that the fishline may be passed through without visually recognizing the rear end of the middle section.

Figure 31:
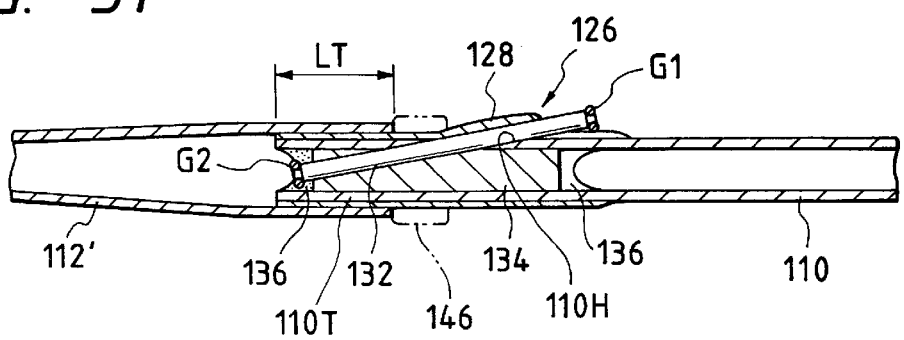
FIG. 31 is side view of 22nd embodiment of the present invention.

FIG. 31 is a sectional view of the vicinity of the fishline lead-in portion of a parallel-coupling type fishing rod allowing a fishline to pass through. The hole 110H is formed in the forepart of the butt grip 110 and a pipe-like guide pipe 121 is inserted therein. The pipe-like guide pipe like this is held by the tubular frame body 128, which also serves as the outer periphery of the butt grip and is secured to the peripheral area of the hole 110H and reinforced. In the inner area of the butt grip on the periphery of the hole 110H, inner reinforcing body 134 is securely disposed and particularly by this inner reinforcing body 134, the insufficient strength of the butt grip because of the presence of the hole 110H is made up. The tubular guide pipe 132 is obliquely passed through the reinforcing body and ceramic fishline guides G1, G2 are secured to both its ends.

The material for use in forming the inner reinforcing body 134, the structure and material for the reinforcing body 136, the effect and the like are similar to those defined according to the embodiment of the invention of FIG. 25. The reinforcing portion of the fishline lead-in portion thus reinforced is used to form the coupling portion 110T whose length range LT is set up to the front position of the hole 110H. In other words, the inner diameter of the middle section 112' is arranged so that the middle section is fitted and inserted in the butt grip within the length range LT. Thus the deflection balance is made improvable by reducing the area where the whole flexural rigidity is raised. In order to reduce the flexural rigidity of the fishline lead-in portion 126, the tubular guide pipe 132 is supported with a cushioning portion of rubber, elastomer resin, synthetic resin or the like, whereby the fishline lead-in portion 126 is easily bent even though the flexural rigidity of the guide pipe 132.

With the use of the cushion member as a support member, the guide pipe is set detachable. In order to make the guide pipe detachable, it may be screwed in. When an annular member is fitted as shown by a chain double-dashed line 146, it functions as what determine the position in which the middle section 112' is fitted and also what firmly fix the tilted guide pipe 132 to the butt grip 110. According to this embodiment of FIG. 31, the deflection balance and the release of stress at the end position of the reinforcing portion are positively accomplished with the simultaneous use of the reinforcing portion of the fishline lead-in portion as the coupling portion.

The structure according to the present invention is also applicable to faucet other than parallel and inversion coupling.

Although a description has been given of a case where a hole is bored in the butt grip 110 (or auxiliary fishing rod 140 fitted therein), it is also acceptable to form a fishline lead-in portion by boring a hole in any section of the fishing rod other than the middle section 112.

Figure 32:
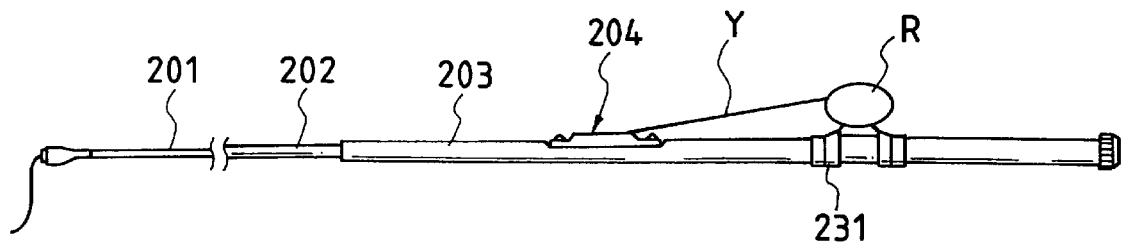
FIG. 32 is diagram descriptive of an overall fishing rod allowing a fishline to pass through according to a 23rd embodiment of the invention.

As shown in FIG. 32, a fishing rod allowing a fishline to pass through according to a 23rd embodiment of the present invention comprises a tip section 1, a middle section 202 containing the tip section 201 in such a manner as to make the middle section 202 retractable and a butt grip 203 containing the retractable middle section 202. The butt grip 203 has a reel leg fixing member 231 for fixedly holding a reel R and a fishline lead-in guide 204 for introducing and guiding a fishline Y into the fishing rod. In the following description, any one of those out of the middle section 202 and the butt grip 203 accommodating a small-diameter section such as the tip section 1 is called a large-diameter section. It is entirely free to choose the middle section 202 or the butt grip 203 as a large-diameter section and according to the following embodiment of the invention, the fishline lead-in guide 4 is to be provided on the butt grip 203, though it may be provided any section other than the butt grip 203.

Figure 33:
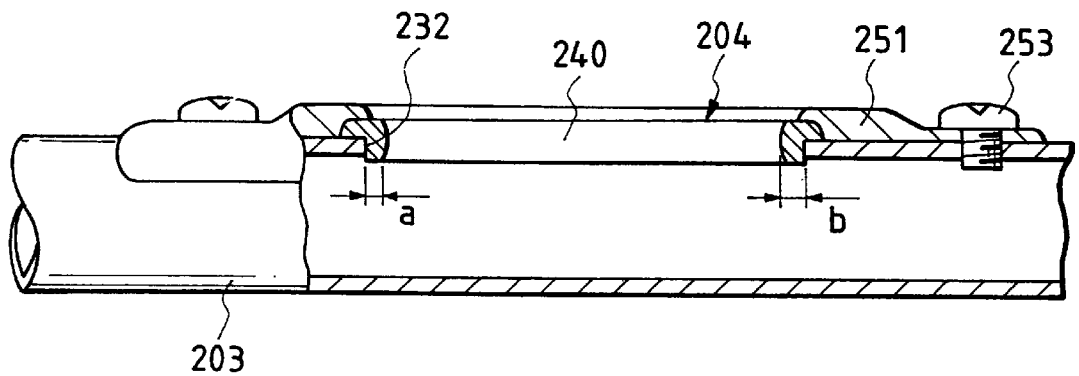
FIG. 33 is side sectional view showing the vicinity of the fishing rod allowing a fishline to pass through according to the 23rd embodiment of the invention.

As shown in FIG. 33, the fishline lead-in guide 204 is fitted in or bonded to a hole portion 232 axially bored in the form of a slot in the butt grip 203 on which the prepreg prepared by impregnating high-strength fiber with synthetic resin. The fishline lead-in guide 204 is covered with a cover member 251 and detachably fixed to the butt grip 203 with a fixing member 253 such as screws in such a state that the fishline lead-in guide 204 has been held down by the cover member 251. Incidentally, the cover member 251 may be fixed to the butt grip 203 by winding a thread thereon or with an adhesive.

The edge face of the fitting (inner) side of the fishline lead-in guide 204 is substantially leveled with the inner peripheral face of the butt grip 203 or otherwise arranged in such a manner that it slightly projects inward from the inner peripheral face thereof; the reason for this is that, that is, the reason for the edge face of the fitting (inner) side of the fishline lead-in guide 204 to be arranged in such a manner that it slightly projects inward from the inner peripheral face thereof is that a fishline is allowed not to contact the inner peripheral face of the butt grip 203. In a case where the edge face of the fitting (inner) side of the fishline lead-in guide 204 is substantially leveled with the inner peripheral face of the butt grip 203, the fishline can be prevented from contacting the inner peripheral face of the butt grip 203 by making the thickness a at the tip end of the fishline lead-in guide 4 greater than the thickness b at the rear end thereof.

As is obvious from FIGS. 34(a) to 34(d), the fishline guide hole 240 of the fishline lead-in guide 204 has a narrow portio 240a at its tip end and a wide portion 240b at its rear end. The narrow and wide portions 240a, 240b are connected in the form of a tapered configuration so that there is not difference in level between them. The front and rear end portions of the guide groove of the fishline lead-in guide 204 are finished with a curve to make them horizontally arcuate so that the resistance of the fishline is lowered when it makes contact with them. Although the wide portion 240b has parallel lines, the present invention is not limited to that arrangement but may be so configured that the narrow portion 240a is tapered up to its rear end.

Although a fishline guide surface 241 for partitioning the fishline guide hole 240 is, as shown in FIG. 34(b), defined as what is arcuate with the central part projecting vertically, it may be vertically linear. Incidentally, the height of a surface to which the hole portion 232 of the fishing rod 203 is fitted is formed so that height (width) is kept equal over the whole periphery; this is to ensure that the hole portion 232 is readily machined and that the fishline lead-in guide 204 is securely fixed. However, that height may be varied in accordance with the shape of the fishline guide surface 241.

Although the fishline lead-in guide 204 has been arranged so that what is separately molded is fitted to the fishing rod 203, the present invention is not limited to this arrangement but may have such a fishline lead-in guide 4 integral with the fishing rod 203 or otherwise the hole portion 232 in a guide-like form. In this case, it is preferred for the hole portion 232 to be made of abrasion material such as metal, ceramics or the like.

FIG. 35 refers to a 24th embodiment of the present invention wherein, in addition to the arrangement made according to the first embodiment of the invention, the height of a fitting portion 261 on the tip end side of a fishline lead-in guide 206 is made substantially equal (including exactly equal) to the wall thickness of the fishing rod 203 and wherein the fitting portion 263 above is projected from the inner peripheral face of the fishing rod 203. Further, the diameter of the fishline guide surface 262 of a fitting portion 261 on the forward end side is gradually increased toward the center of the fishing rod 203, whereas the fishline guide surface 264 of the fitting portion 263 on the rear end side is tapered so that its diameter is gradually increased. This arrangement is intended to make the fishline Y introduced from the tip section (left side in FIG. 35) easily taken out. In other words, the fishline is introduced from the tip end of the tip section 201 by facing the fishline lead-in guide 206 downward (direction opposite to what is shown in FIG. 35). The tip end of the fishline Y will move along the inner periphery of the fishing rod and abut against the fishline guide surface 264 of the fitting portion 263 if it is made to move in the fishing rod toward the rear end thereof. Then the fishline Y is taken out along the tilted face. Incidentally, the tilted fishline guide surfaces 262, 264 may be applicable the fishline guide surface 241 of FIG. 34.

FIG. 36 refers to a 25th embodiment of the present invention wherein the width of the guide hole 270 of a fishline lead-in guide 207 is arranged so that the width at both the front and rear ends is set narrow, whereas the width in the central part in the axial direction is gradually increased. This is because the rear end side of the middle section of the fishing rod is positioned behind the rear end of the fishline lead-in guide when the middle section is contained in the butt grip so as to guide the fishline then. While the middle section is contained in the butt grip, the direction in which the fishline is guided varies greatly and if the fishline is moved, strong force will be applied thereto, whereby this portion is prevented from being damaged by increasing the thickness of the portion. Moreover, the middle section can be accommodated in such a state that the position of the fishline has been regulated in that narrow portion. Consequently, fishlines are prevented from entangling each other in a space portion or any one of them is prevented from catching the middle section.

FIG. 37 refers to a 26th embodiment of the present invention wherein though it is preferred to use a fishing rod as particularly thin as what is intended for lure fishing, the fitting portion of a fishline lead-in guide 208 is padded to ensure the strength of the portion where the fishline lead-in guide 208 is provided. With respect to a fishline guide hole 280 of the fishline lead-in guide 208 in this case, a wide portion 280a is formed on the front end side, whereas a narrow portion 280b is formed on the rear end side. Further, the guide hole portion in the wide portion 80a is opened in such a manner that it is opened upward toward the rear end side.

In the case of a small-diameter fishing rod, its hole is formed as adequate as possible to reduce the fishline resistance. It is also preferred to minimize not only the width of the slot so as to allow a fishline threader or a fishline to be freely taken in or out but also any strength reduction because of the formation of such a hole.

What is shown in FIG. 37 is provided with a guide hole 280 having a wide portion 280a on its front end side and a narrow portion 280b on its rear end side. Conversely, the narrow and wide portions may be formed on the front and rear end sides, respectively. This arrangement is rather fit for relatively large-sized fishing rods.

Although a description has been given of a spinning rod according to the present invention, it is needless to say for the present invention to be applicable to any parallel coupling or single coupling type fishing rod.

As is obvious from the description given above, since the width of the opening formed by the lateral arm portions of the fishline lead-in guide member mounted on the fishing rod allowing a fishline to pass through is greater than the lateral width of the fishline lead-in hole as the first feature of the invention, the upper side of the fishline lead-in hole is opened, whereby the operation of passing and guiding the fishline is performed smoothly and as the lower sides of the arm portions are also opened, the fishline lead-in guide member can be made lightweight and simple in structure.

According to the second feature of the invention, it is possible to reduce manufacturing cost as the number of parts is small while parts control and assembling work are simplified. Moreover, no positional adjustment of the fishline lead-in hole and the guide hole is needed during the assembling work, whereby assembling and fitting up are simplified.

As set forth above, since the fishing rod area on the periphery of the hole has been reinforced according to the third feature of the present invention, breakage is prevented from being started from the area on the periphery of the hole when a load is applied to the fishing rod and besides stress is prevented from being concentrated in that part since flexural rigidity has gradually been decreased at the end of the reinforced portion. Thus the area on the periphery of the hole is hardly damaged but smoothly bent, so that the deflection balance is improved.

As in the fourth feature of the invention since the hole for use in introducing the fishline is formed near the coupling portion, the reinforced portion on the periphery of the hole can be used simultaneously as a coupling portion necessary for reinforcement to hole the coupling strength and consequently a portion having an extremely high stiffness factor becomes smaller as viewed from the whole fishing rod, whereby the deflection balance of the fishing rod is made improvable.

According to the fifth feature of the invention, the guide hole of the fishline lead-in guide for guiding the fishline toward the tip section of a fishing rod therein is made a slot and the guide portion is provided with a wide and a narrow portion, so that fishline resistance is made reducible by ensuring the passability of the fishline sent out of the reel via the narrow portion and introduced from the fishline lead-in guide.

Moreover, the strength of the fishline lead-in guide portion of the fishing rod can be prevented from being lowered since the width of the guide hole in the form of an axial slot is set wide over the whole length thereof.

Further, the thickness of the guide (fishline guide surface) with which the fishline strongly collides can be increased with the effect of preventing not only any reduction in strength due to abrasion but also damage arising therefrom.

What is claimed is:

1. A fishing rod allowing a fishline to pass through an interior passageway along a longitudinal direction, wherein a fishline lead-in guide member has laterally spaced arm portions extended forward along said longitudinal direction and over a fishline lead-in hole provided in a rod pipe, the arm portions form an opening whose width is greater than the lateral width of the fishline lead-in hole, the fishline lead-in guide member further has a fishline guide portion positioned in the rear of the arm portions and provided with a guide hole situated at a level higher than the surface of the rod pipe in the rear of the fishline lead-in hole, and at least one end portion of the fishline lead-in guide member is held by the rod pipe.

2. A fishing rod according to claim 1, wherein the fishline lead-in guide member is formed with a metal sheet.

3. A fishing rod according to claim 1, wherein the fishline lead-in guide member further has leg portions in front of the arm portions and behind the fishline guide portion, both being securely fixed to the rod pipe.

4. A fishing rod according to claim 1, wherein the fishline lead-in guide member is slidably held by the rod pipe with predetermined force so that a position of the fishline lead-in guide member relative to the fishline lead-in hole is made variable.

5. The fishing rod according to claim 1, wherein said lead-in guide member further comprises a leg portion disposed on an outer periphery of said fishing rod, said leg portion abutting a stepwise protrusion formed on a but end grip of said fishing rod.

6. The fishing rod according to claim 1, wherein said guide hole having an axis oriented substantially inclined with respect to an axis of said fishing rod to facilitate entrance of the fishline within said fishing rod.

7. A fishing rod allowing a fishline to pass through an interior passageway along a longitudinal direction, in which a fishline lead-in hole is formed through the fishing rod, front and rear portions of a fishline lead-in guide member are mounted on the fishing rod on opposite sides so that a fishline lead-in guide hole of the fishline lead-in guide member is located behind the fishline lead-in hole formed through the fishing rod, an intermediate portion of the fishline lead-in guide member extends between the front and rear portions like a bridge extending over said fishline lead-in guide hole so as to form a spatial gap radially between the intermediate portion and an outer periphery of the fishing rod.

8. A fishing rod according to claim 7, wherein an outer contour of the intermediate portion is smooth.

9. A fishing rod according to claim 7, wherein the intermediate portion extends above the fishline-lead-in hole of the fishing rod.

10. A fishing rod according to claim 7, wherein the front, intermediate and rear portions are formed as a single integral member.

11. A fishing rod according to claim 7, wherein the intermediate portion is in the form of a curved plate.

12. A fishing rod according to claim 7, wherein the intermediate portion includes a fishline guide portion extending from the rear portion and tilting up forward, an arm portion extending to the front portion and tilting down forward and a connection portion located between the fishline guide portion and the arm portion and most distant from the outer periphery of the fishing rod, the fishline lead-in guide hole of the fishline lead-in guide member is formed through the fishline guide portion.

13. A fishing rod according to claim 12, wherein a fishline guide ring is fixed to the fishline guide portion.

14. A fishing rod according to claim 13, wherein a opening is formed through the arm portion.

15. A fishing rod according to claim 14, wherein the fishline lead-in hole formed through the fishing rod is located between the front and rear portions.

16. The fishing rod according to claim 7, wherein said fishline lead-in hole is defined by a longitudinal slot formed in a but grip portion of said fishing rod and a fishline lead-in guide securely fitted therein.

17. The fishing rod according to claim 7, wherein said fishline lead-in guide hole of said guide member being defined by a substantially annular member having an axis substantially inclined with respect to an axis of said fishing rod.

18. A fishing rod having a fishline introduction hole formed therethrough and a fishline introducing guide member mounted thereon, wherein:

the fishline introducing guide member has right and left arm portions, each extending substantially in a longitudinal direction of the fishing rod to a position forward of fishline introducing hole, said right and left arm portions cooperatively defining a lateral opening width therebetween, which is larger than a lateral opening width of the fishline introducing hole;

the fishline introducing guide member further has a fishline guide, located opposite the right and left arm portions with respect to said fishline introducing hole, for guiding a fishline at a position spaced from a surface of the fishing rod; and the fishline introducing guide member is mounted so that the fishline guide is located behind the fishline introducing hole, and said fishline introducing guide member forms a bridge over said fishline introducing hole to thereby define a space radially between the fishline introducing guide member and said fishline introducing hole.

19. A fishing rod having a fishline introduction hole formed therethrough and a fishline introducing guide member mounted thereon, wherein:

the fishline introducing guide member includes a metal plate member mounted on the fishing rod to extend across the fishline introducing hole and define a space radially between said fishline introducing hole and said metal plate member;

the metal plate member has a curved rear portion expanded outwardly, and a pair of arm portions each having a wide surface side defining a width and a narrow surface side defining a thickness;

the metal plate member further has an apex portion connecting the curved rear portion to the arm portions; and the apex portion is three-dimensionally bent so that the wide surface side of each arm portion is directed laterally.

* * * * *